United States Patent
Egawa

(10) Patent No.: US 8,212,899 B2
(45) Date of Patent: Jul. 3, 2012

(54) IMAGING APPARATUS CAPABLE OF HIGHLY ACCURATE DEFECTIVE PIXEL CORRECTION PROCESSING

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 501 days.

(21) Appl. No.: 12/109,093

(22) Filed: Apr. 24, 2008

(65) Prior Publication Data
US 2008/0266428 A1    Oct. 30, 2008

(30) Foreign Application Priority Data

Apr. 27, 2007  (JP) .................................. 2007-119929

(51) Int. Cl.
*H04N 9/64* (2006.01)
*H04N 5/217* (2011.01)

(52) U.S. Cl. ........................................ 348/246; 348/241
(58) Field of Classification Search ........... 348/241–249
See application file for complete search history.

(56) References Cited

U.S. PATENT DOCUMENTS

| | | | |
|---|---|---|---|
| 6,882,754 B2 | 4/2005 | Hayashi | |
| 7,050,651 B2 | 5/2006 | Zaklika et al. | |
| 2002/0122123 A1* | 9/2002 | Kimura | 348/246 |
| 2002/0158977 A1* | 10/2002 | Hamilton, Jr. | 348/246 |
| 2005/0219390 A1* | 10/2005 | Tajima et al. | 348/246 |
| 2006/0238629 A1* | 10/2006 | Sato et al. | 348/241 |
| 2007/0097237 A1* | 5/2007 | Kono | 348/246 |
| 2007/0127836 A1 | 6/2007 | Subbotin | |

FOREIGN PATENT DOCUMENTS

| | | |
|---|---|---|
| JP | 9-247548 | 9/1997 |
| JP | 2003-116060 | 4/2003 |
| JP | 2004-112736 | 4/2004 |
| JP | 2005-528857 | 9/2005 |
| JP | 2006-238060 | 9/2006 |

OTHER PUBLICATIONS

U.S. Appl. No. 12/019,191, filed Jan. 24, 2008, Egawa Yoshitaka, et al.

* cited by examiner

*Primary Examiner* — Kelly L Jerabek
(74) *Attorney, Agent, or Firm* — Oblon, Spivak, McClelland, Maier & Neustadt, L.L.P.

(57) ABSTRACT

There is provided an imaging apparatus which uses a defect correction circuit to perform predetermined signal processing with respect to image signals output from an imaging section in which a plurality of pixels each formed of a photoelectric transducer with a color filter provided thereon are two-dimensionally arranged. The defect correction circuit includes a pattern extraction circuit which extracts image pattern information based on a signal of an adjacent pixel that is adjacent to a judgment target pixel and signals of peripheral pixels that are close to the adjacent pixel and have the same color as the adjacent pixel in the image signals, and a substitution circuit which substitutes a signal of the judgment target pixel by signals of peripheral pixels that are close to the judgment target pixel and have the same color as the judgment target pixel.

23 Claims, 21 Drawing Sheets

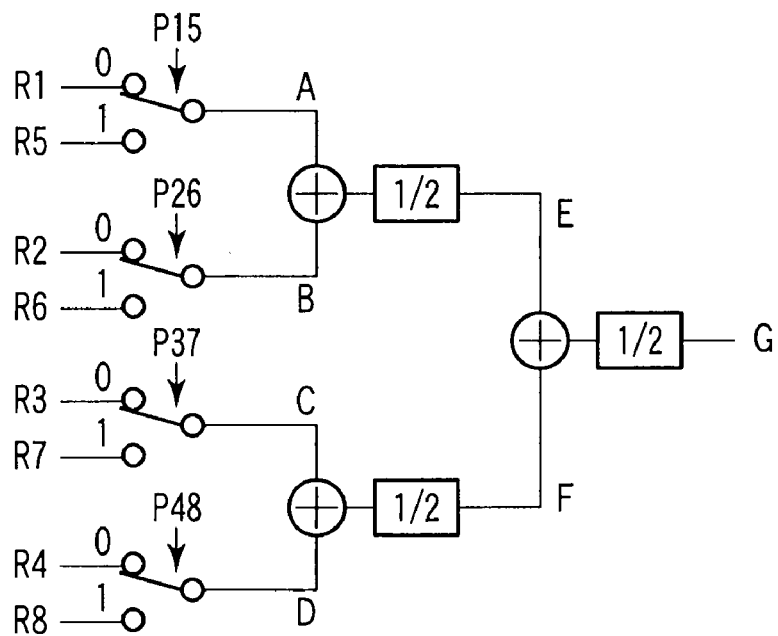
F I G. 5A
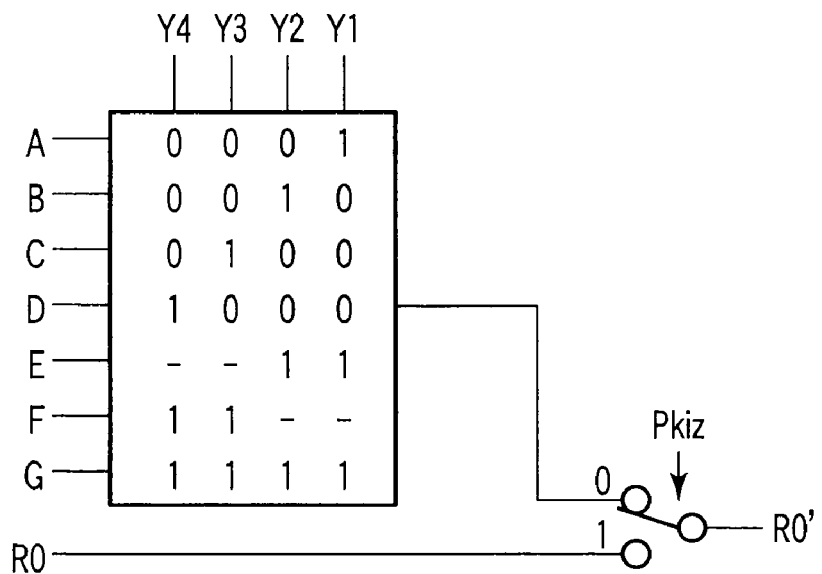
F I G. 5B

| Y4 | Y3 | Y2 | Y1 | Substitution processing |
|---|---|---|---|---|
| 0 | 0 | 0 | 1 | R0'=(R1+R5)/2 |
| 0 | 0 | 1 | 0 | R0'=(R3+R7)/2 |
| 0 | 1 | 0 | 0 | R0'=(R2+R6)/2 |
| 1 | 0 | 0 | 0 | R0'=(R4+R8)/2 |
| 0 | 0 | 1 | 1 | R0'=(R1+R5+R3+R7)/4 |
| 1 | 1 | 0 | 0 | R0'=(R2+R6+R4+R8)/4 |
| 1 | 1 | 1 | 1 | R0'=(R1+R5+R3+R7+R2+R6+R4+R8)/8 |

F I G. 9

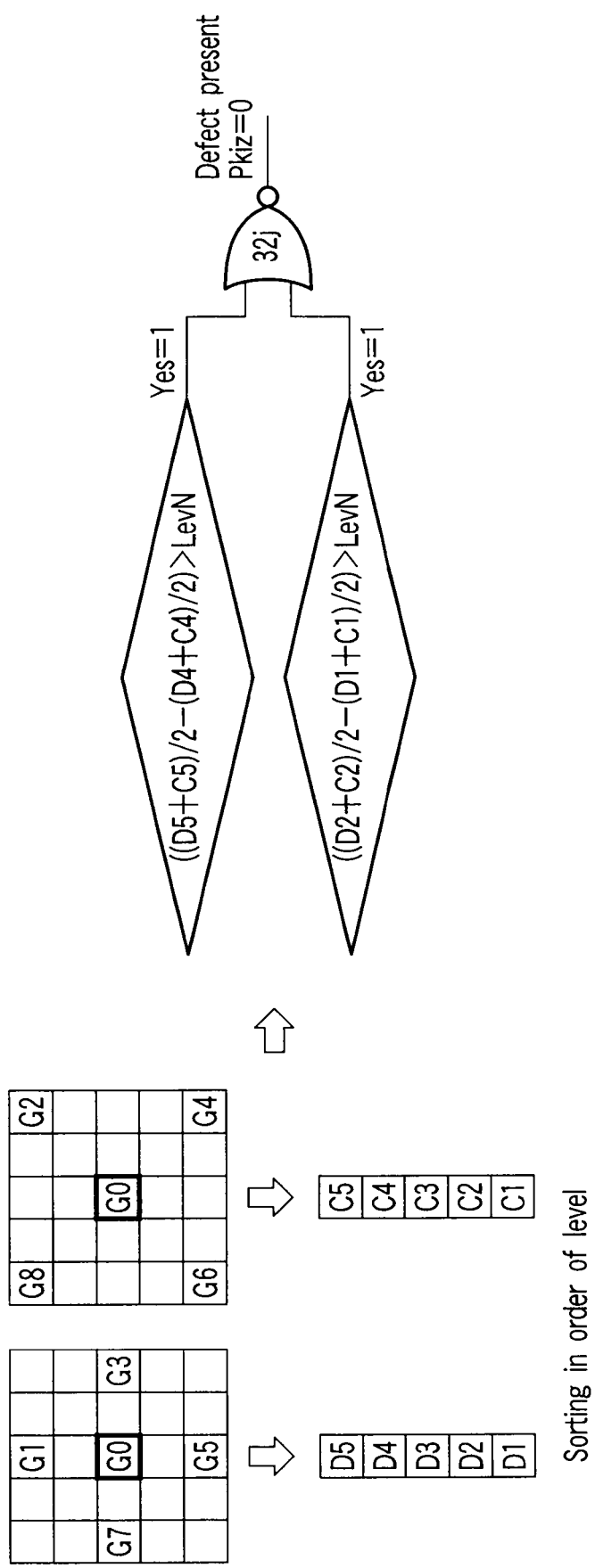
F I G. 17

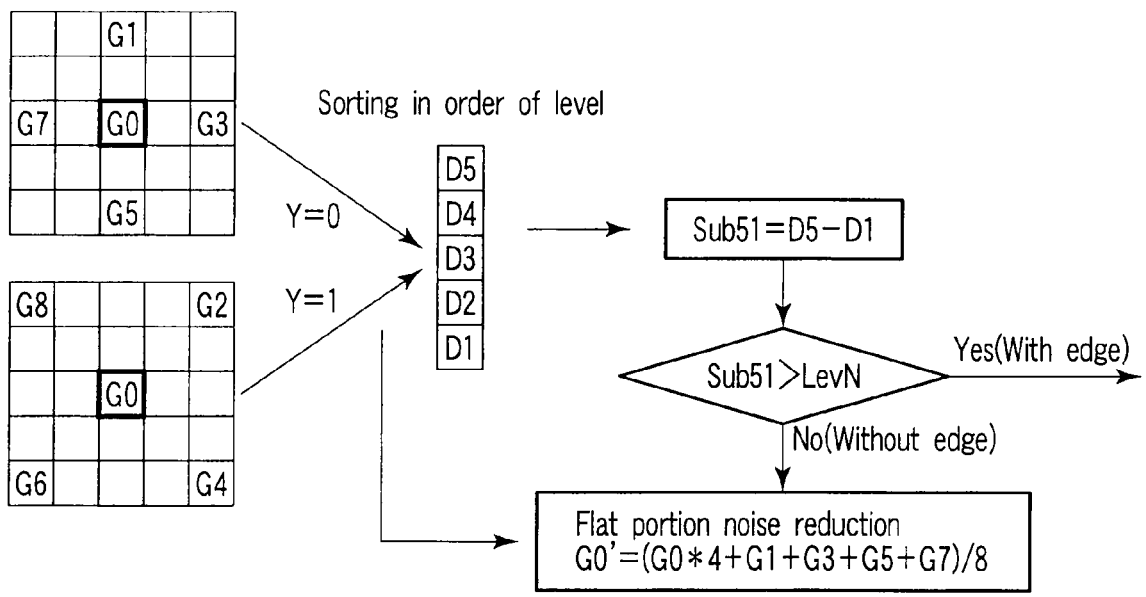
F I G. 20

IMAGING APPARATUS CAPABLE OF HIGHLY ACCURATE DEFECTIVE PIXEL CORRECTION PROCESSING

CROSS-REFERENCE TO RELATED APPLICATIONS

This application is based upon and claims the benefit of priority from prior Japanese Patent Application No. 2007-119929, filed Apr. 27, 2007, the entire contents of which are incorporated herein by reference.

BACKGROUND OF THE INVENTION

1. Field of the Invention

The present invention relates to an imaging apparatus. More particularly, the present invention relates to a complementary metal oxide semiconductor (CMOS) image sensor for use in, e.g., a camera-equipped mobile phone, a digital camera, a video camera, and others.

2. Description of the Related Art

In general, a white defect and a black defect due to, e.g., a manufacturing process are apt to be produced in an image sensor. In a single-plate color camera adopting an RGB Bayer arrangement, as a method of correcting a signal of a defective pixel, substitution processing using median filtering is known (see, for example, Jpn. Pat. Appln. KOKAI Publication No. 2006-238060 or Jpn. Pat. Appln. KOKAI Publication No. 09-247548). This method corrects a signal of a defective pixel in real time without using a memory. Further, a method of utilizing the average value of peripheral pixels around a defective pixel to substitute the signal of the defective pixel (see, for example, Jpn. Pat. Appln. KOKAI Publication No. 2004-112736) or a method of substituting a signal of a defective pixel by a maximum value (a signal having a maximum level) or a minimum value (a signal having a minimum level) of peripheral pixels (see, for example, Jpn. PCT National Publication No. 2005-528857) has been proposed.

However, any of the above-explained methods cannot judge whether a defective pixel is a defective pixel in a vertical image pattern or a defective pixel in a lateral image pattern. Therefore, a signal of a defective pixel is substituted by an intermediate value (a signal having an intermediate level) of signals of peripheral eight signals having the same color by median filtering, or substituted by a maximum value or a minimum value of signals of peripheral eight pixels having the same color, or substituted by the average value of upper and lower or right and left two pixels having the same color. Therefore, there is a problem that a resolution of the defective pixel is degraded or erroneous correction is apt to occur at an end portion (an edge portion) of an image pattern.

BRIEF SUMMARY OF THE INVENTION

According to a first aspect of the present invention, there is provided an imaging apparatus which uses a defect correction circuit to perform predetermined signal processing with respect to image signals respectively output from an imaging section in which a plurality of pixels each formed of a photoelectric transducer with a color filter provided thereon are two-dimensionally arranged, wherein the defect correction circuit includes:

a pattern extraction circuit which extracts image pattern information based on a signal of an adjacent pixel that is adjacent to a judgment target pixel and signals of peripheral pixels that are close to the adjacent pixel and have the same color as the adjacent pixel in the image signals; and a substitution circuit which substitutes a signal of the judgment target pixel by signals of peripheral pixels that are close to the judgment target pixel and have the same color as the judgment target pixel.

According to a second aspect of the present invention, there is provided an imaging apparatus which uses a defect correction circuit to perform predetermined signal processing with respect to image signals respectively output from an imaging section in which a plurality of pixels each formed of a photoelectric transducer are two-dimensionally arranged, wherein the defect correction circuit includes:

a pattern extraction circuit which extracts image pattern information based on a signal of an adjacent pixel that is adjacent to a judgment target pixel and signals of peripheral pixels that are close to the adjacent pixel and have the same color as the adjacent pixel in the image signals; and a substitution circuit which substitutes a signal of the judgment target pixel by signals of peripheral pixels that are close to the judgment target pixel and have the same color as the judgment target pixel.

According to a third aspect of the present invention, there is provided an imaging apparatus which uses a defect correction circuit to perform predetermined signal processing with respect to image signals respectively output from an imaging section in which a plurality of pixels each formed of a photoelectric transducer with a color filter provided thereon are two-dimensionally arranged, wherein the defect correction circuit performs:

sorting the signal of the judgment target pixel and signals of peripheral pixels having the same color as the judgment target pixel in order of level in the image signals;

calculating a subtraction result by subtracting a signal at a predetermined rank excluding a smallest one in a smaller signal side from a signal at a predetermined rank excluding a largest one in a larger signal side and multiplying the subtraction result by a predetermined coefficient to obtain a first signal;

adding the first signal to the signal at a predetermined rank in a larger signal side to obtain a second signal;

subtracting the first signal from the signal at a predetermined rank in a smaller signal side to obtain a third signal;

determining whether the signal of the judgment target pixel is larger than the second signal;

determining whether the signal of the judgment target pixel is smaller than the third signal; and substituting the signal of the judgment target pixel in accordance with determination.

BRIEF DESCRIPTION OF THE SEVERAL VIEWS OF THE DRAWING

FIGS. 5A and 5B are views for explaining an operation of a defective pixel/substitution processing circuit according to the second embodiment of the present invention;

FIG. 9 is a view for explaining an operation of a defective pixel/substitution processing circuit according to the fifth embodiment of the present invention;

FIG. 17 is a view for explaining another example of the adjacent pixel/pattern extraction circuit according to the 11th embodiment of the present invention;

FIG. 20 is a view for explaining the operation of the defect correction circuit according to the 12th embodiment of the present invention.

DETAILED DESCRIPTION OF THE INVENTION

Embodiments of the present invention will be described with reference to the accompanying drawings. It should be noted that the drawings are schematic ones and the dimension ratios shown therein are different from the actual ones. The dimensions vary from drawing to drawing and so do the ratios of dimensions. The following embodiments are directed to a device and a method for embodying the technical concept of the present invention and the technical concept does not specify the material, shape, structure or configuration of components of the present invention. Various changes and modifications can be made to the technical concept without departing from the scope of the claimed invention.

First Embodiment

Figure 1:
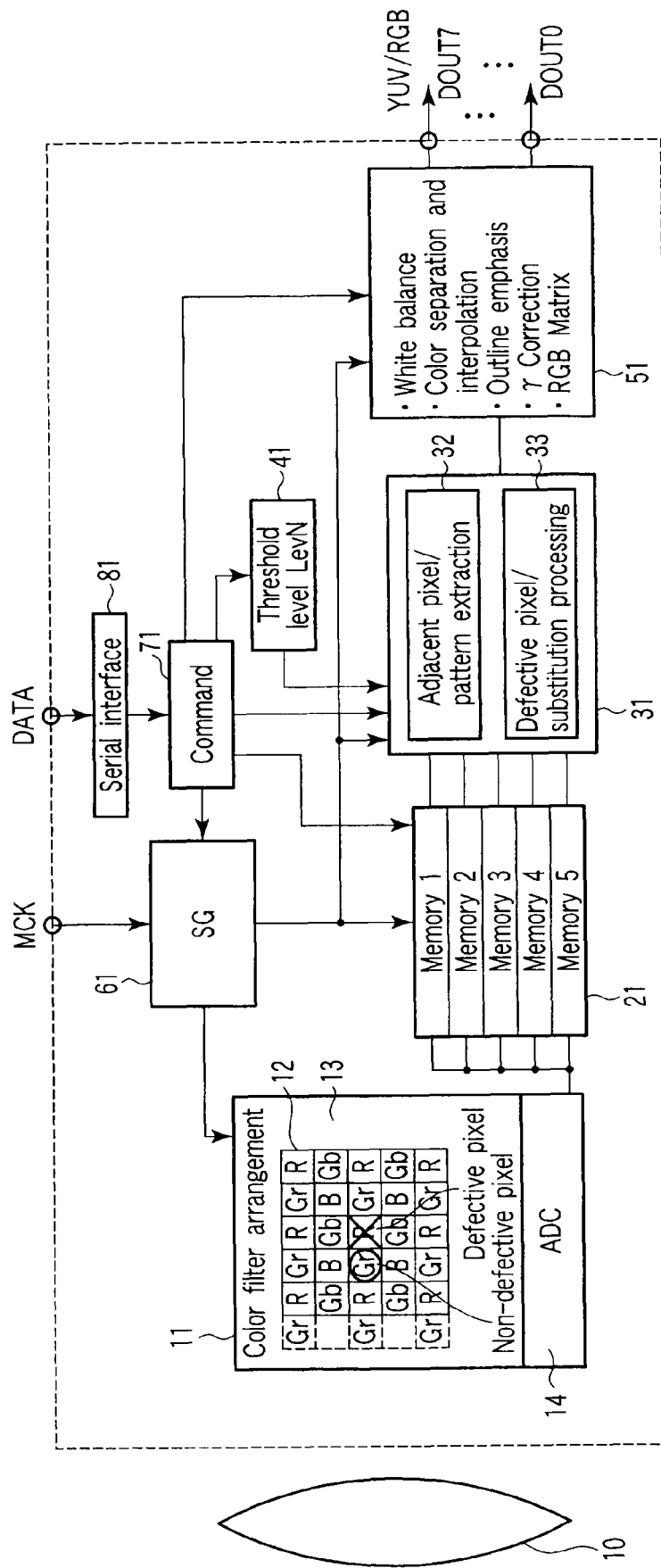
FIG. 1 is a block diagram showing a structural example of an imaging apparatus (a CMOS image sensor) according to a first embodiment of the present invention.

FIG. 1 shows a structural example of an imaging apparatus according to a first embodiment of the present invention. It is to be noted that an example of a CMOS image sensor will be explained in this embodiment.

In FIG. 1, a sensor section 11 has a color filter 12, a photodiode array (an imaging section) 13 in which a plurality of pixels (photoelectric transducers) are two-dimensionally arranged, and a columnar analog-to-digital converter (ADC) 14. The color filter 12 divides a light signal condensed by a lens (an imaging system) 10 into RGB signals and forms their images on the photodiode array 13. The photodiode array 13 converts the image-formed RGB signals into signal electric charges in accordance with each of pixels to be transmitted to the ADC 14. The ADC 14 converts the received signal electric charge of each pixel into a digital signal (an image signal) and outputs each converted signal to a line memory 21. It is to be noted that a Bayer arrangement (a tetragonal arrangement) of RGB primary colors based on a matrix of 2×2 is assumed as a color filter arrangement of the color filter 12.

The line memory 21 has memories 1 to 5 corresponding to, e.g., vertical five lines, and respectively stores output signals from the sensor section 11 (the image signals from the ADC 14). The line memory 21 supplies the image signals for the five lines to a defect correction circuit 31.

The defect correction circuit 31 fetches the image signals corresponding to the five lines from the line memory 21 in parallel, and appropriately uses a threshold level (a noise threshold value) LevN from a level setting circuit 41 to execute defective pixel correction processing for the image signals. This defect correction circuit 31 is formed of an adjacent pixel/pattern extraction circuit 32 that extracts an image pattern (pattern information) as a judgment target pixel and a defective pixel/pattern extraction circuit 33 that detects a defective pixel (a deficient pixel) to perform substitution processing. That is, in the defect correction circuit 31, the adjacent pixel/pattern extraction circuit 32 first uses a signal of a non-defective pixel (an effective pixel) adjacent to a defective pixel and signals of peripheral eight pixels having the same color to extract a pattern of an image. Then, the defective pixel/substitution processing circuit 33 uses, e.g., the signals of the peripheral eight pixels having the same color as the defective pixel to substitute the signal of the defective pixel in accordance with an image pattern extraction result.

It is to be noted that the threshold level LevN is appropriately set while assuming random noise and others and serves as a reference when judging a defective pixel. For example, when a signal of a pixel as a processing target is higher than the threshold level LevN, this pixel is determined as a defective pixel (or an edge portion of an image pattern).

A signal processing circuit 51 performs known signal processing, e.g., white balance processing, color separation and interpolation processing, outline emphasis processing, and gamma (γ) correction processing with respect to an output from the defect correction circuit 31. Furthermore, an RGB matrix circuit generates YUV signals or RGB signals to be output to the outside from output terminals DOUT 0 to DOUT 7.

A system timing generation circuit (SG) 61 controls the sensor section 11, the line memory 21, the defect correction circuit 31, and the signal processing circuit 51 in accordance with a clock signal MCK from the outside and/or a command from a command control circuit 71.

The command control circuit 71 generates a command associated with data DATA supplied from the outside through a serial interface (I/F) 81 to control parameters of the line memory 21, the defect correction circuit 31, the level setting circuit 41, the signal processing circuit 51, the SG 61, and others.

Figure 2A:
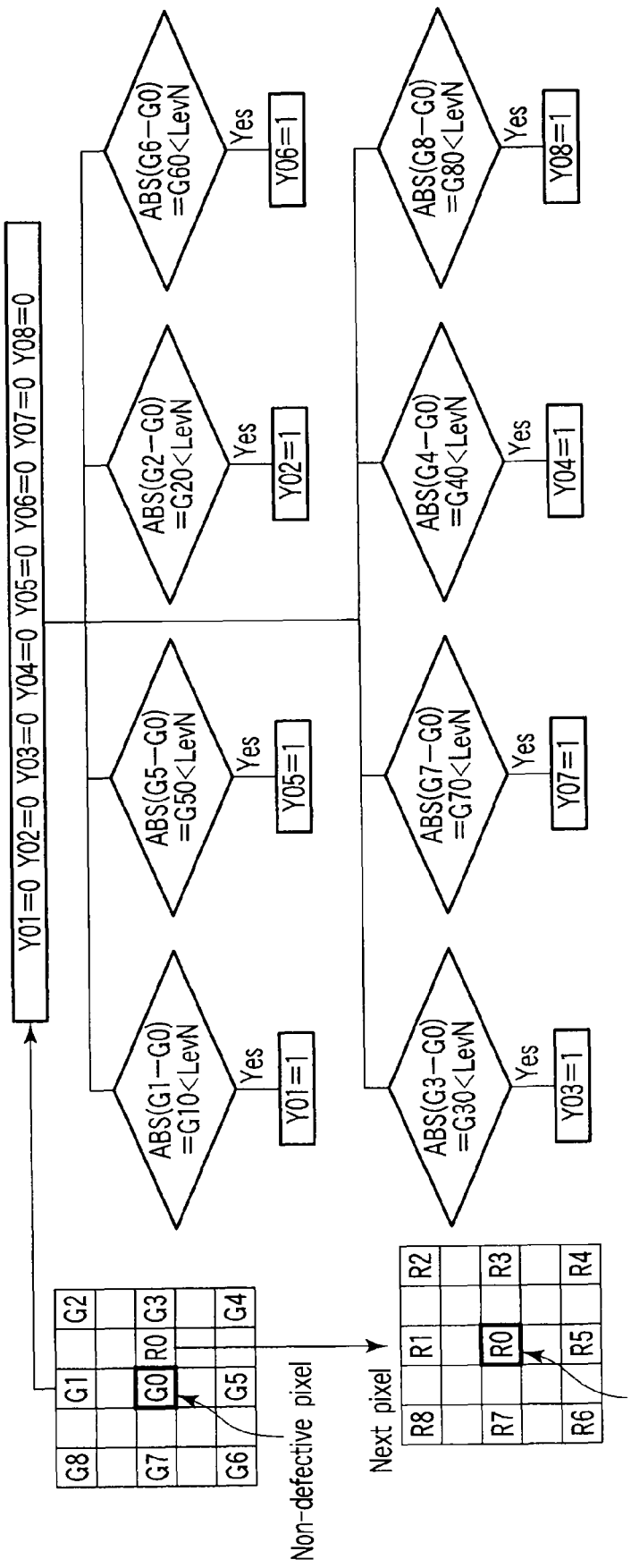
FIGS. 2A and 2B are views for explaining an operation of an adjacent pixel/pattern extraction circuit of a defect correction circuit in the CMOS image sensor depicted in FIG. 1.
Figure 2B:
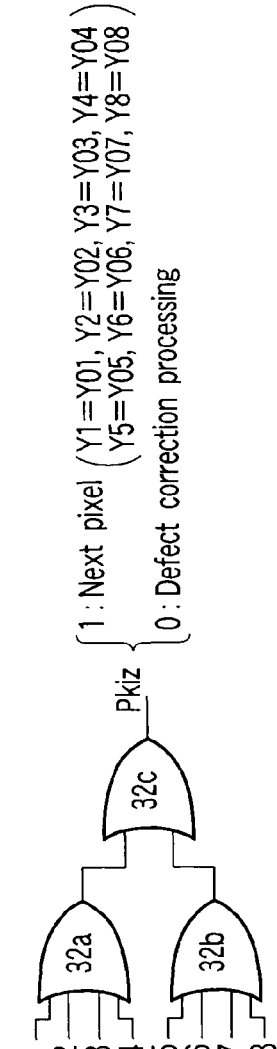

FIGS. 2A and 2B are views for explaining an operation of the adjacent pixel/pattern extraction circuit 32 of the defect correction circuit 31 in the image sensor having the structure depicted in FIG. 1. Here, a description will be given as to an example where R0 is a defective pixel and G0 adjacent to this pixel is a non-defective pixel with respect to a pixel arrangement (a color filter arrangement) depicted in FIG. 2A.

First, a signal of the adjacent pixel G0 that is adjacent to the defective pixel R0 and signals of peripheral eight G pixels (peripheral pixels) G1 to G8 having the same color are used to extract a pattern of an image (in this example, matching pixel pitches of the G pixels, the R pixels, and B pixels simplifies processing).

Here, the signal of the R pixel adjacent to the G pixel has substantially the same pattern as that of the signal of the G pixel. Based on this characteristic, a pattern of an image is extracted by generating an absolute value (ABS) of each of difference signals between the signal of the adjacent pixel G0 and the signals of the peripheral pixels G1 to G8 and judging whether the absolute value of each difference signal is larger than the threshold level LevN. If the absolute value of each difference signal is smaller than the threshold level LevN, the signals of the peripheral pixels G1 to G8 are determined as signals equal to the signal of the adjacent pixel G0 in level. A vertical image pattern, a lateral image pattern, or an oblique image pattern can be extracted depending on a position of each of the peripheral pixels (G1 to G8) in eight directions, namely, an upper direction (Y01)/a lower direction (Y05), a left direction (Y07)/a right direction (Y03), an upper right direction (Y02)/a lower left direction (Y06), and a lower right direction (Y04)/and an upper left direction (Y08) of the adjacent pixel G0 along which a signal equal to this adjacent pixel G0 in level is provided.

That is, for example, as shown in FIG. 2A, when an absolute value G10 (=ABS(G1−G0)) of a difference signal between the signal of the adjacent pixel G0 and the signal of the upper (Y01) peripheral pixel G1 is smaller than the threshold level LevN, the signal of the peripheral pixel G1 is determined to be equal to the signal of the adjacent pixel G0 in level (Y01=1). Likewise, for example, when an absolute value G50 (=ABS(G5−G0)) of a difference signal between the signal of the adjacent pixel G0 and the signal of the lower (Y05) peripheral pixel G5 is smaller than the threshold level LevN, the signal of the peripheral pixel G5 is determined to be equal to the signal of the adjacent pixel G0 in level (Y05=1). Likewise, for example, when an absolute value G20 (=ABS(G2−G0)) of a difference signal between the signal of the adjacent pixel G0 and the signal of the upper right (Y02) peripheral pixel G2 is smaller than the threshold level LevN, the signal of the peripheral pixel G2 is determined to be equal to the signal of the adjacent pixel G0 in level (Y02=1). Likewise, for example, when an absolute value G60 (=ABS (G6−G0)) of a difference signal between the signal of the adjacent pixel G0 and the signal of the lower left (Y06) peripheral pixel G6 is smaller than the threshold level LevN, the signal of the peripheral pixel G6 is determined to be equal to the signal of the adjacent pixel G0 in level (Y06=1).

Likewise, for example, when an absolute value G30 (=ABS(G3−G0)) of a difference signal between the signal of the adjacent pixel G0 and the signal of the right (Y03) peripheral pixel G3 is smaller than the threshold level LevN, the signal of the peripheral pixel G3 is determined to be equal to the signal of the adjacent pixel G0 in level (Y03=1). Likewise, for example, when an absolute value G70 (=ABS(G7−G0)) of a difference signal between the signal of the adjacent pixel G0 and the signal of the left (Y07) peripheral pixel G7 is smaller than the threshold level LevN, the signal of the peripheral pixel G7 is determined to be equal to the signal of the adjacent pixel G0 in level (Y07=1). Likewise, for example, when an absolute value G40 (=ABS(G4−G0)) of a difference signal between the signal of the adjacent pixel G0 and the signal of the lower right (Y04) peripheral pixel G4 is smaller than the threshold level LevN, the signal of the peripheral pixel G4 is equal to the signal of the adjacent pixel G0 in level (Y04-1). Likewise, for example, when an absolute value G80 (=ABS (G8−G0)) of a difference signal between the signal of the adjacent signal G0 and the signal of the upper left (Y08) peripheral pixel G8 is smaller than the threshold level LevN, the signal of the peripheral pixel G8 is determined to be equal to the signal of the adjacent pixel G0 in level (Y08=1).

On the other hand, for example, as shown in FIG. 2B, when judgment values of all the peripheral pixels G1 to G8 in the eight directions Y01 to Y08 are "0", the adjacent pixel G0 is determined as a defective pixel based on outputs (Pkiz (control signals)=0) from OR circuits (generating sections) 32a, 32b, and 32c, and later-explained substitution processing for defect correction is executed.

In contrast, when outputs from the OR circuits 32a, 32b, and 32c are "Pkiz=1", the adjacent pixel G0 is determined as a non-defective pixel. As a result, the judgment values in the eight directions Y01 to Y06 are stored in an internal register (not shown) as respective pieces of pattern information Y1 to Y8 in order to store a pattern of an image.

Moreover, the above-explained processing is repeatedly executed with respect to the next pixel, i.e., the defective pixel R0. As a result, "Pkiz=0" is obtained based on judgment values in the eight directions Y01 to Y08 of peripheral eight R pixels (peripheral pixels) R1 to R8 having the same color around the defective pixel R0, and the defective pixel is determined. Then, the later-explained substitution processing for defect correction is executed.

Figure 3B:
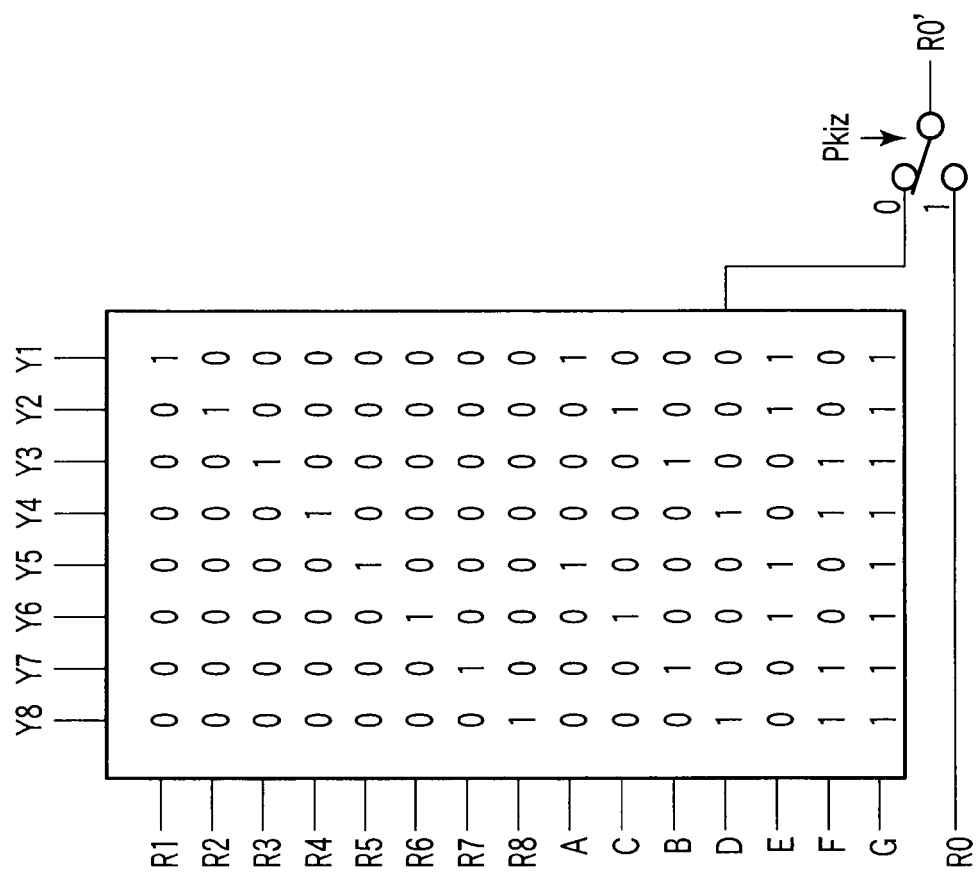
FIGS. 3A and 3B are views for explaining an operation of a defective pixel/substitution processing circuit of the defect correction circuit in the CMOS image sensor depicted in FIG. 1.
Figure 3A:
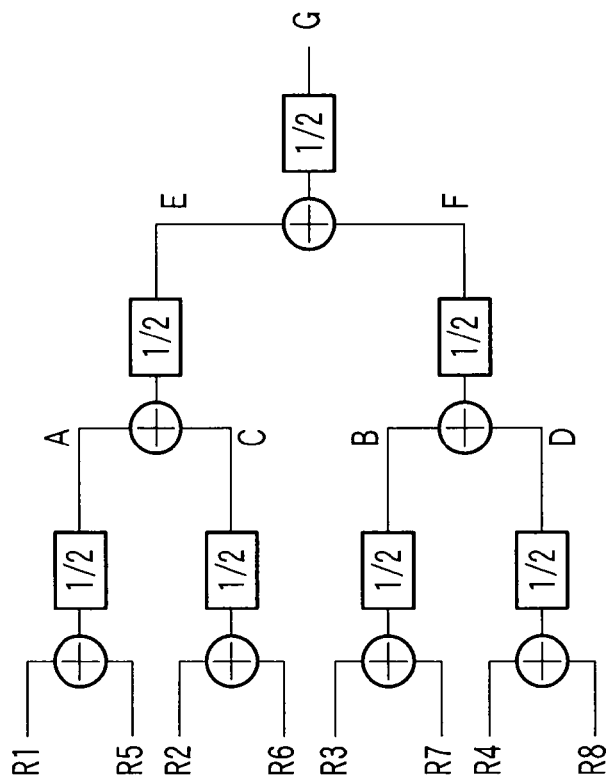

FIGS. 3A and 3B are views for explaining an operation of the defective pixel/substitution processing circuit 33 of the defect correction circuit 31 in the image sensor having the structure depicted in FIG. 1. It is to be noted that a description will be given on an example where R0 is a defective pixel and signals of peripheral eight pixels R1 to R8 having the same color as the defective pixel R0 are also utilized as substitution data R0' as they are.

In this embodiment, a flat portion in an image pattern excluding an edge portion is subjected to substitution processing by using an averaged signal, thereby reducing random noise. Therefore, as shown in FIG. 3A, an averaged signal A is generated from the average value of signals of the peripheral pixels R1 and R5 in the vertical direction (Y01, Y05), an averaged signal B is generated from the average value of signals of the peripheral pixels R3 and R7 in the lateral direction (Y03, Y07), an averaged signal C is generated from the average value of signals of the peripheral pixels R2 and R6 in the oblique direction (Y02, Y06), an averaged signal D is generated from the average value of signals of the peripheral pixels R4 and R8 in the oblique direction (Y04, Y08), and an averaged signal G is generated from the average value of signals of the peripheral eight pixels R1 to R8. It is to be noted that an averaged signal E is generated as the average value of the averaged signals A and C (the average value of the signals of the peripheral pixels R1, R2, R5, and R6) and an averaged signal F is generated as the average value of the averaged signals B and D (the average value of the signals of the peripheral pixels R3, R4, R7, and R8), respectively.

The respective signals of the peripheral eight pixels R1 to R8 or the averaged signals A to G are selected in a signal selector circuit in accordance with the respective pieces of pattern information Y1 to Y8 obtained from the signal of the adjacent non-defective pixel G0 as shown in FIG. 3B, for example. The selected signals of the peripheral eight pixels R1 to R8 or the selected averaged signals A to G are turned to substitution data R0' by changing over switches in accordance with outputs (Pkiz=0) from the OR circuits 32a, 32b, and 32c, and this data substitutes for the signal of the defective pixel R0.

That is, the signal of the defective pixel R0 is substituted by any one of the respective signals of the peripheral eight pixels R1 to R8 or the averaged signals A to G associated with the pieces of pattern information Y1 to Y8. For example, when the respective pieces of pattern information Y1 to Y8 are "10000000", this is determined as an edge portion of an image pattern, and the signal of the defective pixel R0 is substituted by the substitution data R0' formed of the signal of the peripheral pixel R1. For example, when the respective pieces of pattern information Y1 to Y8 are "11111111", this is determined as a flat portion of an image pattern, and the signal of the defective pixel R0 is substituted by the substitution data R0' formed of the averaged signal G.

Such processing is likewise sequentially carried out with respect to each of Gr pixels, B pixels, and Gb pixels. Using the pieces of pattern information Y1 to Y8 enables realizing the substitution processing optimum for an image pattern. Therefore, degradation in a resolution of the defective pixel can be avoided. Furthermore, erroneous correction at an edge portion of an image pattern can be also avoided.

Of course, the signal of the defective pixel R0 determined as a flat portion of the image pattern can be substituted by the respective signals of the peripheral eight pixels R1 to R8 alone without using the averaged signals.

As explained above, extracting pattern information of an image from the non-defective pixel adjacent to the defective pixel as a judgment target pixel and effecting the substitution processing according to this image pattern enables realizing highly accurate defective pixel correction processing.

Second Embodiment

FIGS. 4A and 4B and FIGS. 5A and 5B are views for explaining an operation of a defect correction circuit 31 according to a second embodiment of the present invention. Here, a description will be given as to an example where the circuit scale of a defective pixel/substitution processing circuit 33 can be reduced. It is to be noted that parts equal to those in the first embodiment will be briefly explained.

Figures 4A, 4B:
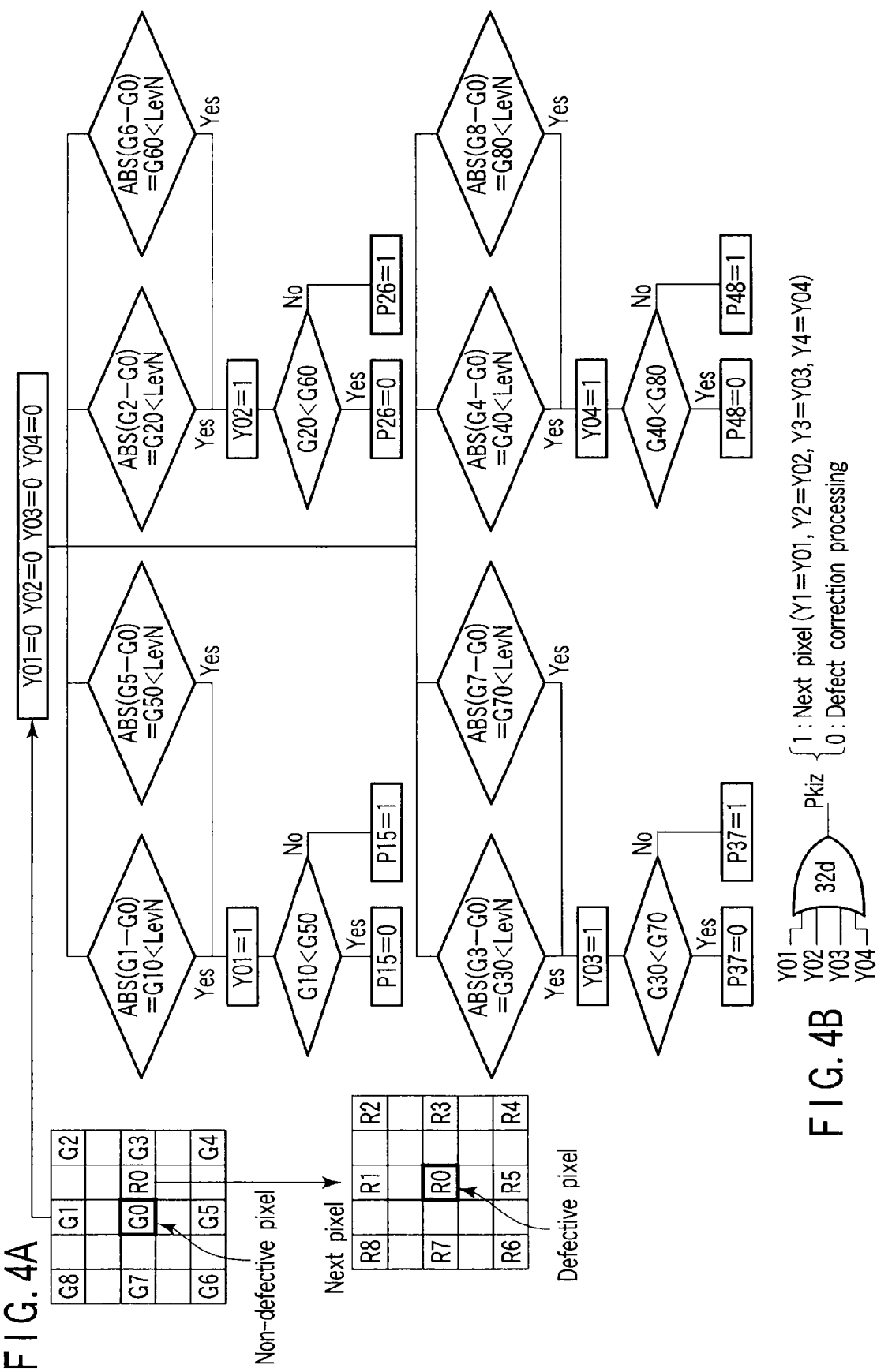
FIGS. 4A and 4B are views for explaining an operation of an adjacent pixel/pattern extraction circuit according to a second embodiment of the present invention.

FIGS. 4A and 4B are views for explaining an operation of an adjacent pixel/pattern extraction circuit 32 in a defect correction circuit 31. For example, as shown in FIG. 4A, the adjacent pixel/pattern extraction circuit 32 in this embodiment obtains pattern information in four directions (Y1=Y01, Y2=Y02, Y3=Y03, Y4=Y04), i.e., an up-and-down direction (Y01), a right-and-left direction (Y03), and two oblique directions (Y02, Y04) based on respective signals of an adjacent pixel G0 and peripheral eight pixels G1 to G8 having the same color.

Furthermore, in regard to the vertical (up-and-down) direction, a difference signal (an absolute value) between the signal of the adjacent pixel G0 and the signal of the peripheral pixel G1 in the upper direction is determined as G10, a difference signal (an absolute value) between the signal of the adjacent pixel G0 and the signal of the peripheral pixel G5 in the lower direction is determined as G50, and a level relationship of these signals is judged. If the difference signal G10 is smaller than the difference signal G50, a selection value P15 is set to "0". If the difference signal G10 is larger than the difference signal G50 (including a case where both signals are equal), the selection value P15 is set to "1". Likewise, in regard to the lateral (right-and-left) direction and the two oblique (cross or X-shaped) directions, "0/1" judgment of selection values P26, P37, and P48 is carried out.

If all judgment values in the four directions Y01 to Y04 are "0", for example, as shown in FIG. 4B, the adjacent pixel G0 is determined as a defective pixel as a judgment target pixel based on an output (Pkiz (a control signal)=0) from an OR circuit (a generating section) 32d. In contrast, when an output from the OR circuit 32d is "Pkiz=1", the judgment values in the four directions Y01 to Y04 are respectively stored in an internal register (not shown) as pieces of pattern information Y1 to Y4 in order to store a pattern of an image.

FIGS. 5A and 5B are views for explaining an operation of a defective pixel/substitution processing circuit 33 in the defect correction circuit 31. For example, as shown in FIG. 5A, the defective pixel/substitution processing circuit 33 according to this embodiment adopts a method of selecting one of signals of two pixels in each of directions Y01, Y02, Y03, and Y04 in accordance with each selection value P15, P26, P37, or P48 in order to reduce the circuit scale.

For example, based on a determination that a smaller one of the difference signals G10 and G50 in the up-and-down direction is closer to the signal of the defective pixel R0, the selection value P15 selects a smaller one of the signals of the peripheral pixels R1 and R5 as a selected signal A even if an image pattern is vertical strips. Likewise, the selection value P26 selects a smaller one of the signals of the peripheral pixels R2 and R6 as a selected signal B. Likewise, the selection value P37 selects a smaller one of the signals of the peripheral pixels R3 and R7 as a selected signal C. Likewise, the selection value P48 selects a smaller on the signals of the peripheral pixels R4 and R8 as a selected signal D.

Furthermore, when the image pattern is formed of a vertical strip and a lateral strip or it is a plus-sign-like pattern enabling detection of corners of a square, an averaged signal E is generated from the average value of the selected signal A and the selected signal B. When the image pattern is formed of a right oblique line and a left oblique line or it is a cross (X-shaped) pattern enabling detection of corners of a square rotated at 45 degrees, an averaged signal F is generated from the average value of the selected signal C and the selected signal D. Moreover, in regard to a flat portion of the image pattern, an averaged signal G is generated from the average value of the averaged signal E and the averaged signal F.

For example, as shown in FIG. 5B, the selected signals A to D and the averaged signals E to G are selected in a signal selector circuit in accordance with respective pieces of pattern information Y1 to Y4 obtained from the signal of the adjacent non-defective pixel G0. The selected signals A to D and the averaged signals E to G selected in this manner are turned to substitution data R0' by changing over a switch in accordance with an output (Pkiz=0) from the OR circuit 32d, and this data substitutes for the signal of the defective pixel R0. As a result, even when the circuit scale of the defective pixel/substitution processing circuit 33 is reduced, the signal of the defective pixel R0 can be highly accurately substituted by the substitution data R0' while decreasing random noise.

When such a structure is adopted, the circuit scale can be reduced, and highly accurate defective pixel correction processing can be realized.

Third Embodiment

Figure 6:
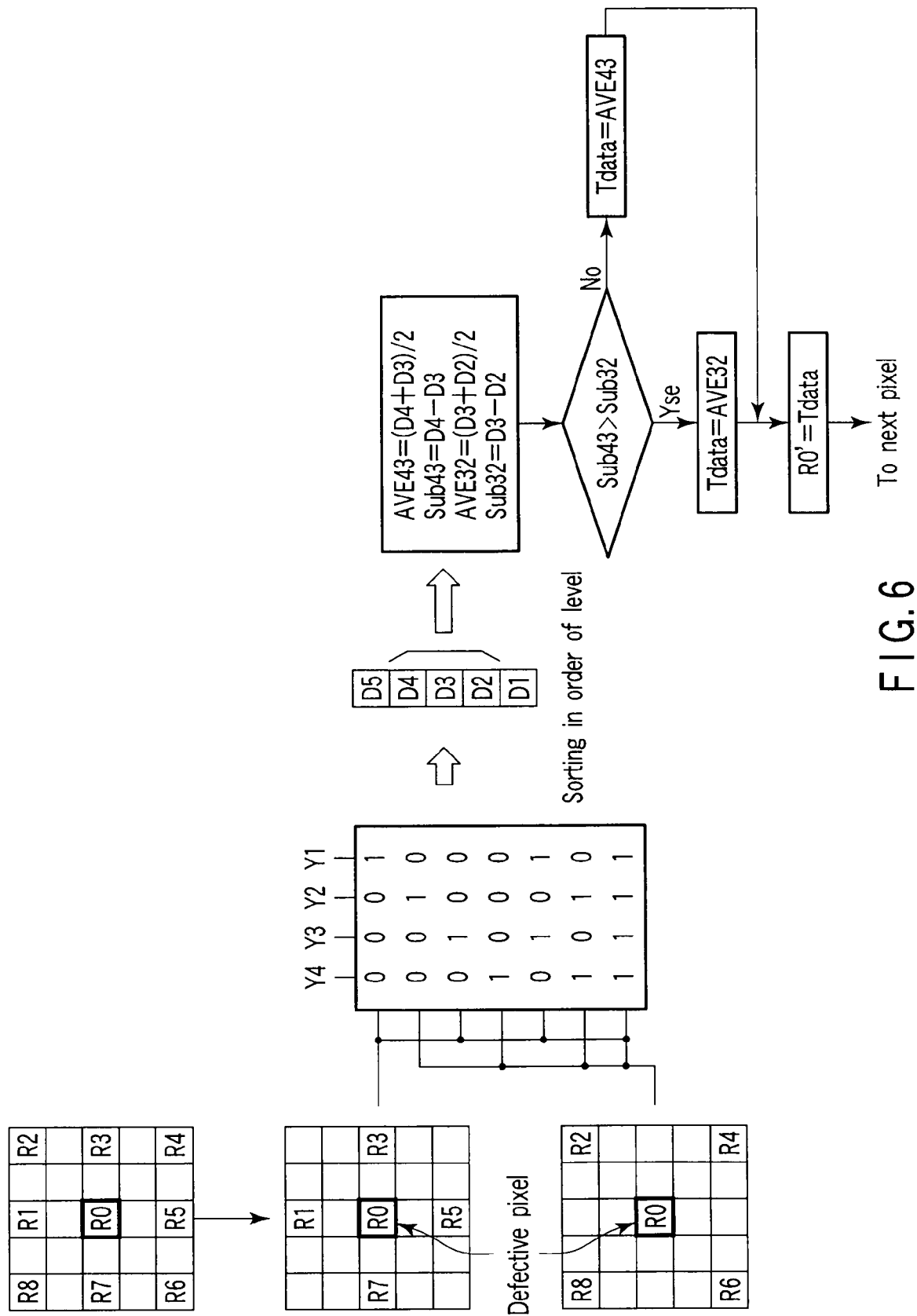
FIG. 6 is a view for explaining an operation of a defective pixel/substitution processing circuit according to a third embodiment of the present invention.

FIG. 6 is a view for explaining an operation of a defective pixel/substitution processing circuit 33 in a defect correction circuit 31 according to a third embodiment of the present invention. In this embodiment, a description will be given as to an example where defective pixel substation processing is carried out by a method different from the method depicted in FIGS. 5A and 5B. It is to be noted that an explanation on parts equal to those in the second embodiment will be omitted.

First, signals of peripheral eight pixels R1 to R8 in a plus-sign-like (Y01, Y03) direction and a cross (Y02, Y04) direction having the same color as that of a defective pixel R0 that is a judgment target pixel are prepared, respectively.

Then, the signals of the peripheral four pixels in the plus-sign-like direction having the same color as that of the defective pixel R0 or the signals of the peripheral four pixels in the cross direction having the same are selected as substitution data R0' in accordance with pieces of pattern information Y1 to Y4. However, when the pieces of pattern information Y1 to Y4 select both the plus-sign-like direction and the cross direction, the signals of the peripheral four pixels R1, R3, R5, and R7 in the plus-sign-like direction which are close to the defective pixel R0 are used.

Subsequently, signals of five pixels including the signals of the peripheral four pixels in the plus-sign-like direction or the signals of the peripheral four pixels in the cross direction selected and a signal of the defective pixel R0 are sorted in order of level (D5 to D1).

Here, it is determined that a pixel corresponding to a minimum value D1 of the signals may possibly have a black defect and a pixel corresponding to a maximum value D5 of the same may possibly have a white defect, and the signal of the defective pixel R0 is assumed to be one of intermediate values D2, D3, and D4 excluding the maximum value D5 and the minimum value D1. Simply, intermediate value D3 can be selected.

In this example, to reduce random noise, a difference signal (an absolute value) of the intermediate values D4 and D3 is determined as Sub43, and an averaged signal is determined as AVE43. Likewise, a difference signal (an absolute value) of the intermediate values D3 and D2 is determined as Sub32, and an averaged signal is determined as AVE32. Moreover, a smaller one of the average values AVE43 and AVE32 of these difference signals Sub43 and Sub32 is determined as substitution data R0' (=Tdata) and substitutes for the signal of the defective pixel R0.

It is to be noted that the average value of the intermediate values D2, D3, and D4 may be determined as the substitution data R0' (=Tdata) to substitute for the signal of the defective pixel R0.

When the substitution processing is carried by such a method, the circuit scale can be reduced, and highly accurate defective pixel correction processing can be realized.

Fourth Embodiment

Figures 7A, 7B:
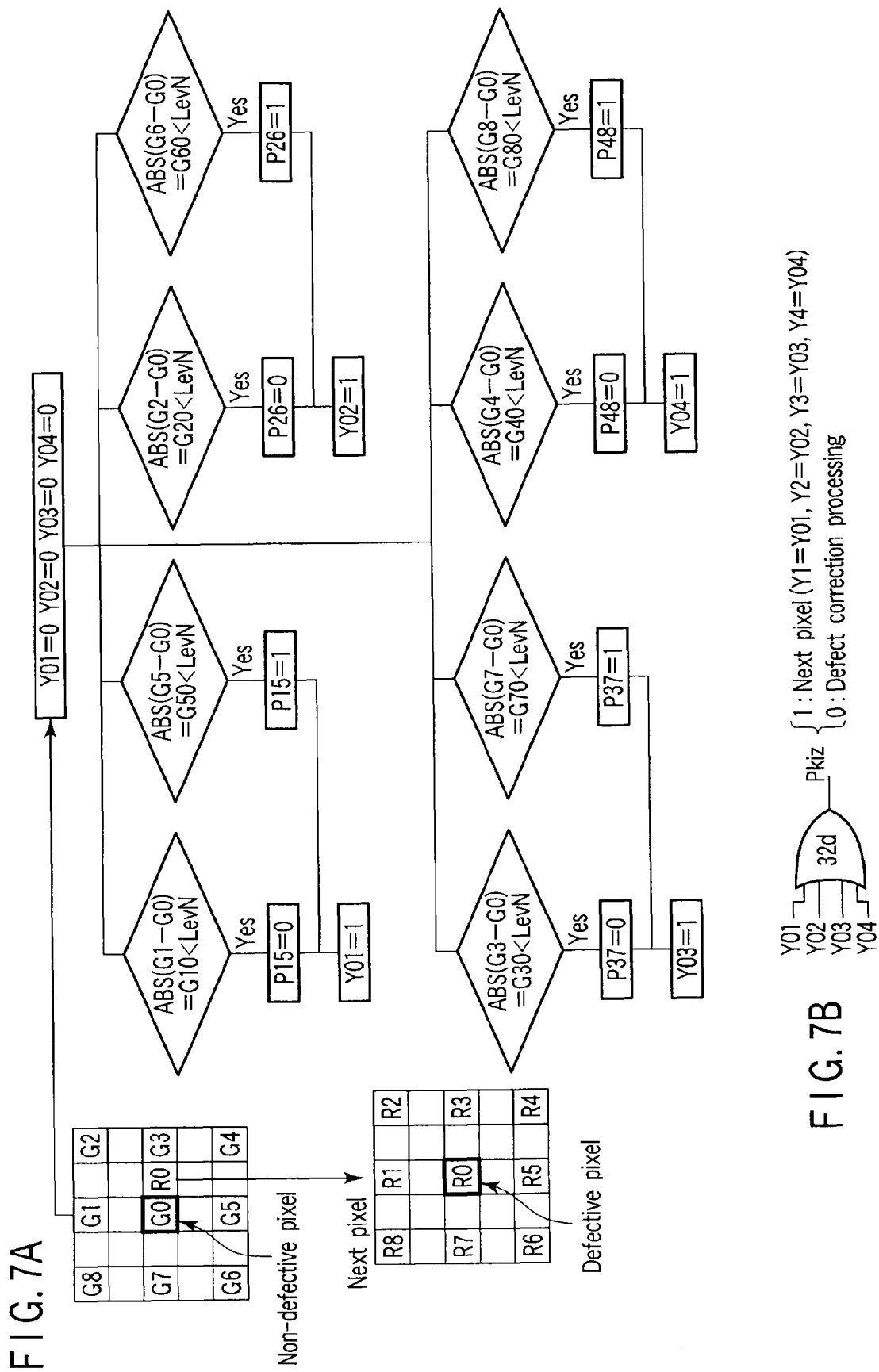
FIGS. 7A and 7B are views for explaining an operation of an adjacent pixel/pattern extraction circuit according to a fourth embodiment of the present invention.

FIGS. 7A and 7B are views for explaining an operation of a defect correction circuit 31 according to a fourth embodiment of the present invention. In this embodiment, a description will be given as to an example where an operation of the adjacent pixel/pattern extraction circuit 32 depicted in FIGS. 4A and 4B can be further simplified. It is to be noted that parts equal to those in the second embodiment will be briefly explained.

In this embodiment, a judgment is first made upon whether difference signals (absolute values) G10, G20, G30, G40, G50, G60, G70, and G80 between a signal of an adjacent pixel G0 and signals of peripheral pixels G1 to G8 in eight directions which are close to the adjacent pixel G0 and have the same color as the adjacent pixel G0 are smaller than a threshold level LevN.

Then, of the difference signals determined to be smaller than the threshold level LevN, signals equal to the adjacent pixel G0 in level are selected by priorities in regard to an up-and-down (Y01) direction, a right-and-left (Y03) direction, and two oblique (Y02, Y04) directions.

That is, the priority of one of the difference signals in each direction is increased, and the difference signal having the higher priority is selected as a judgment value in accordance with each direction. For example, when the signal of the peripheral pixel G1 in the Y01 direction is determined to be equal to the signal of the adjacent pixel G0 in level, a selection value P15 is set to "0". On the other hand, when the signal of the peripheral pixel G5 is determined to be equal to the signal of the adjacent pixel G0 in level, the selection value P15 is set to "1". In case of giving a priority to the judgment result that the signal of the peripheral pixel G5 is equal to the signal of the adjacent pixel G0 in level, even if the signal of the peripheral pixel G1 is determined to be equal to the signal of the adjacent pixel G0 in level and "0" is set in the selection value P15, when the signal of the peripheral pixel G5 is determined to be equal to the signal of the adjacent pixel G0 in level, "1" that is the selection value P15 is selected as a judgment value (Y01=1).

In this manner, likewise performing subsequent defective pixel substitution processing as explained above in accordance with respective pieces of pattern information Y1 (=Y01), Y2 (=Y02), Y3 (=Y03), and Y4 (=Y04) to be obtained enables simplifying the pattern extraction processing and realizing highly accurate defective pixel correction processing.

Fifth Embodiment

Figure 8:
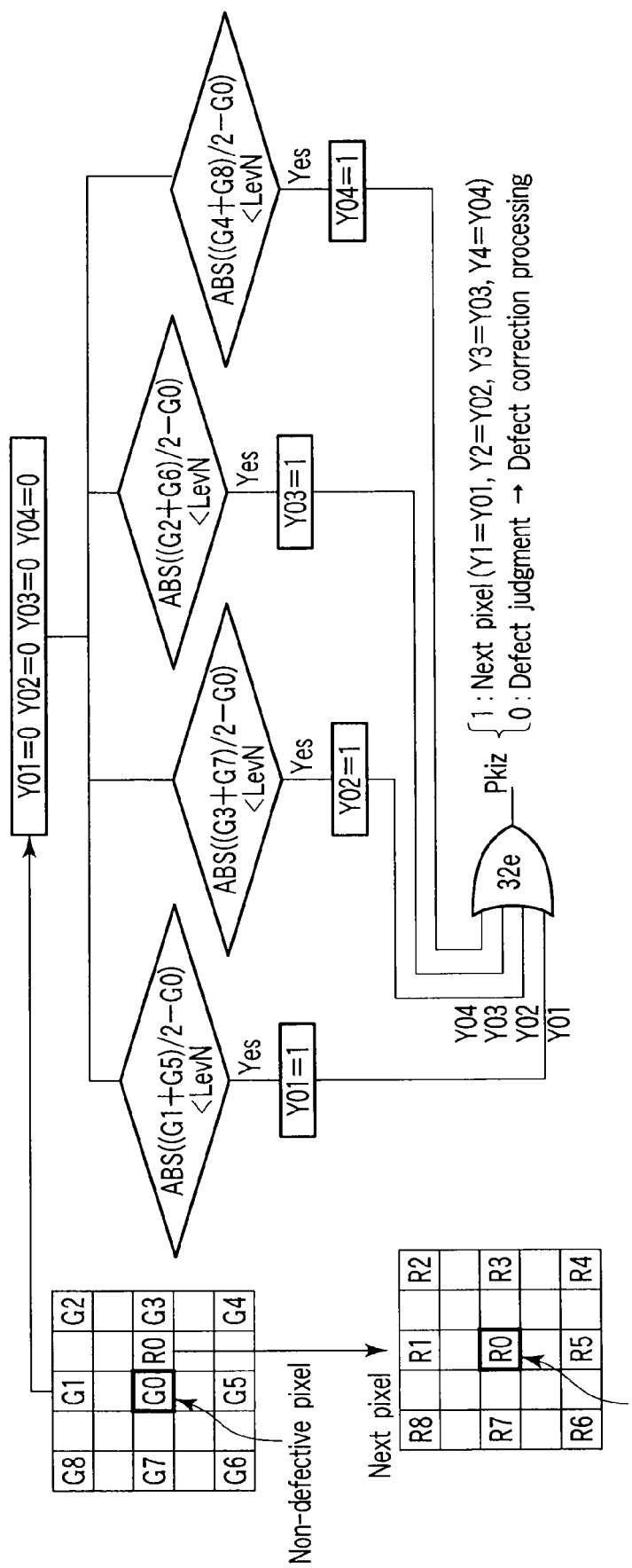
FIG. 8 is a view for explaining an operation of an adjacent pixel/pattern extraction circuit according to a fifth embodiment of the present invention.

FIGS. 8 and 9 are views for explaining an operation of a defect correction circuit 31 according to a fifth embodiment of the present invention. In this embodiment, a description will be given as to an example where an image pattern is not extracted from a signal of an adjacent pixel G0 and signals of peripheral eight pixels having the same color but the image pattern is extracted from correlations between the signal of the adjacent pixel G0 and signals of peripheral pixels in four directions, i.e., a vertical direction, a lateral direction, and two oblique directions. It is to be noted that a detailed explanation of the same parts will be omitted.

FIG. 8 is a view for explaining an operation of an adjacent pixel/pattern extraction circuit 32 in a defect correction circuit 31. The adjacent pixel/pattern extraction circuit 32 according to this embodiment judges whether an absolute value of a difference signal between the average value of signals of peripheral pixels G1 and G5 in an up-and-down (Y01) direction and a signal of an adjacent pixel G0 is smaller than a threshold level LevN, for example. When the absolute value is smaller (Y01=1), it can be determined that there is a correlation in the vertical direction. Likewise, presence/absence of a correlation is judged in regard to each of a right-and-left (Y02) direction and two oblique (Y03, Y04) directions.

When one of judgment values in the four directions Y01 to Y04 is "1" (Pkiz=1) based on an output (a control signal Pkiz) from an OR circuit (a generating section) 32e, it is determined that the adjacent pixel G0 is not a defective pixel as a judgment target pixel, and the respective judgment values are stored in an internal register (not shown) as respective pieces of pattern information (Y1=Y01, Y2=Y02, Y3=Y03, and Y4=Y04). When all the judgment values in the four directions Y01 to Y04 are "0" (Pkiz=0), the adjacent pixel G0 is determined as the defective pixel, and defective pixel substitution processing by a defective pixel/substitution processing circuit 33 depicted in FIG. 9 is performed.

FIG. 9 is a view for explaining an operation of the defective pixel/substitution processing circuit 33 in the defect correction circuit 31. The defective pixel/substitution processing circuit 33 according to this embodiment selects substitution data R0' obtained by appropriately averaging the respective signals of the peripheral eight pixels R1 to R8 having the same color as the defective pixel R0 in accordance with the obtained pieces of pattern information Y1 to Y4, thereby substituting the signal of the defective pixel R0.

For example, when there is a correlation in the up-and-down direction (Y1=1), the average value of the signals of the peripheral pixels R1 and R5 is determined as the substitution data R0' to substitute for the signal of the defective pixel R0. Moreover, for example, when there are correlations in all of the up-and-down direction, the right-and-left direction, and the two oblique directions (Y1, Y2, Y3, Y4=1), the average value of the respective signals of the peripheral pixels R1 to R8 is determined as the substitution data R0' to substitute for the signal of the defective pixel R0.

When the structure according to this embodiment is adopted, an accuracy for pattern extraction can be improved, and appropriately averaging the respective signals of the peripheral pixels in the eight directions enables reducing random noise and noise of the substitution data R0'.

Sixth Embodiment

Figure 10:
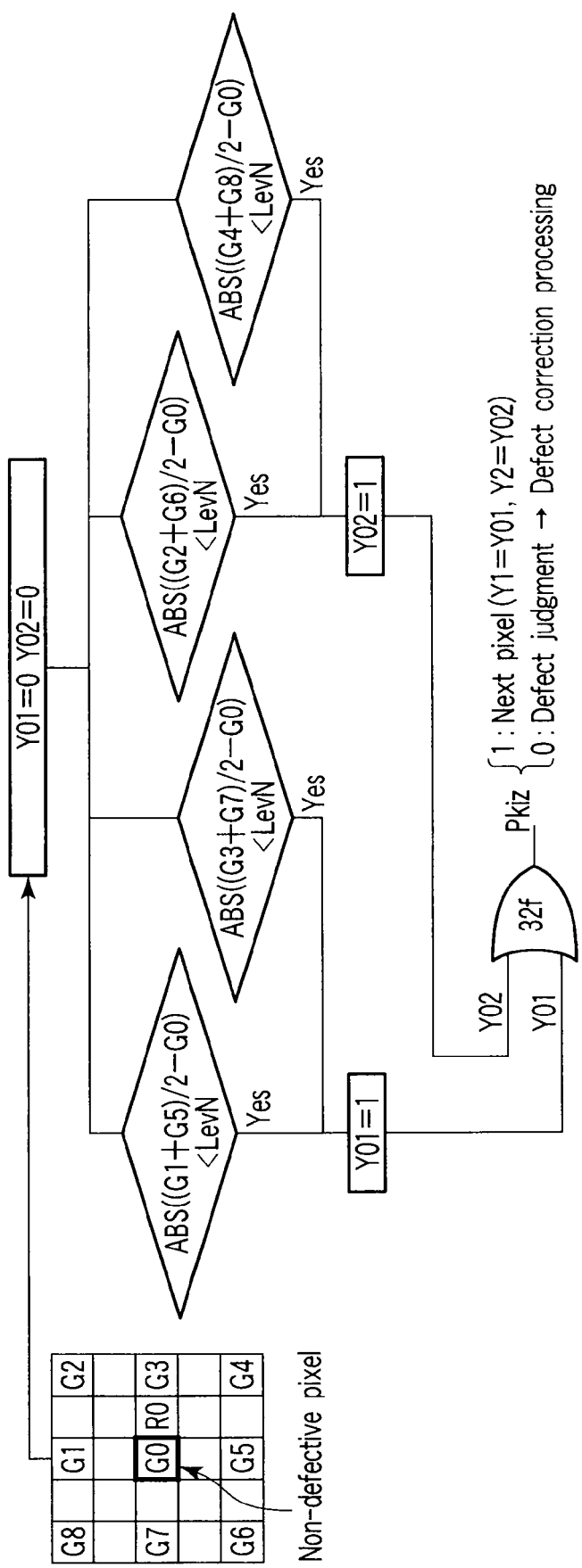
FIG. 10 is a view for explaining an operation of an adjacent pixel/pattern extraction circuit according to a sixth embodiment of the present invention.
Figure 11:
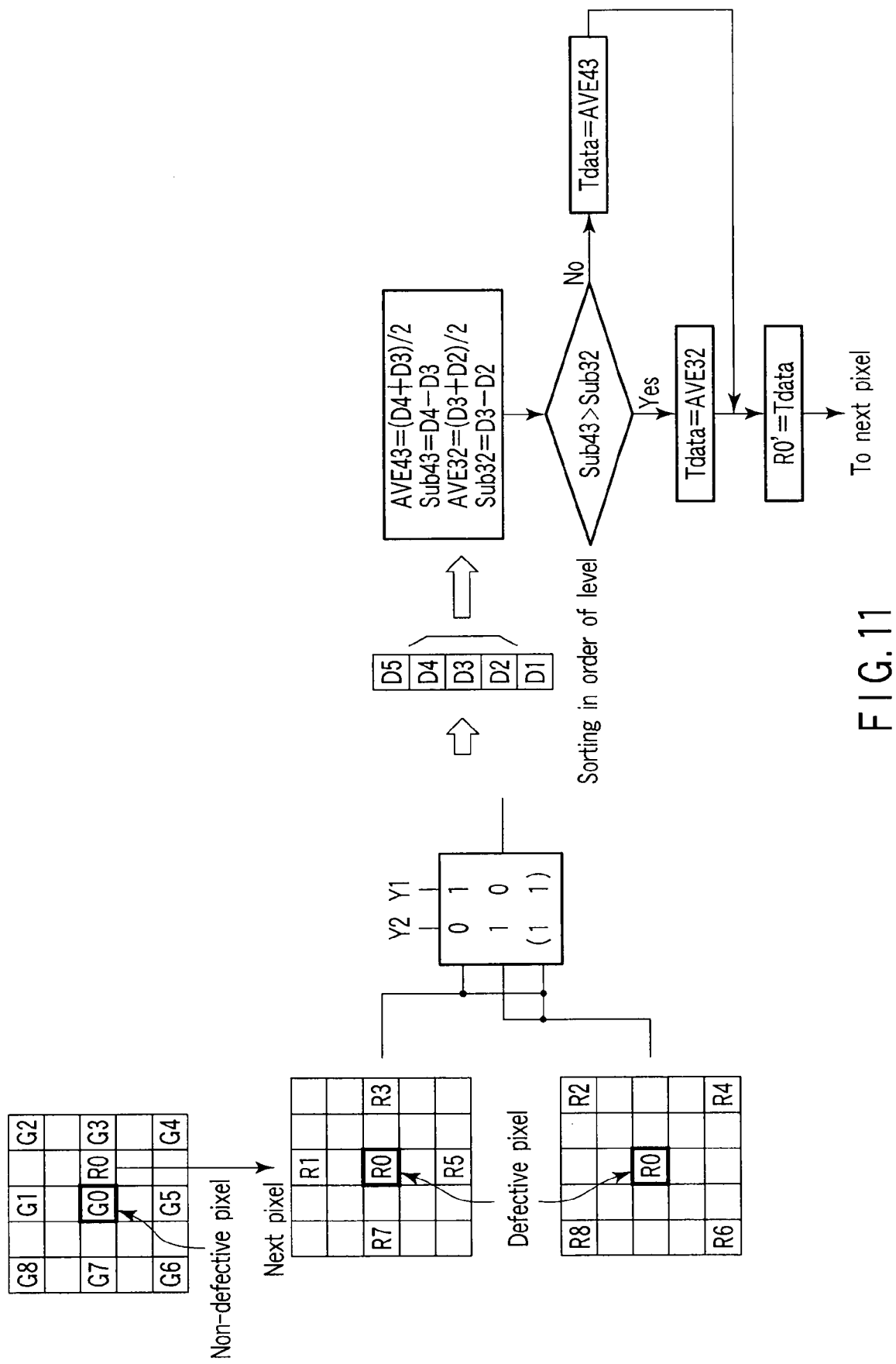
FIG. 11 is a view for explaining an operation of a defective pixel/substitution processing circuit according to the sixth embodiment of the present invention.

FIGS. 10 and 11 are views for explaining an operation of a defect correction circuit 31 according to a sixth embodiment of the present invention. In this embodiment, a description will be given as to an example where an image pattern is not extracted from respective signals of peripheral pixels having the same color as that of a signal of an adjacent pixel G0 but the image pattern is extracted by judging whether the adjacent pixel G0 has a stronger correlation with respect to the peripheral pixels in a plus-sign-like direction or whether it has a stronger correlation with respect to the peripheral pixels in a cross direction. It is to be noted that a detailed explanation of tautological parts will be omitted.

FIG. 10 is a view for explaining an operation of an adjacent pixel/pattern extraction circuit 32 in a defect correction circuit 31. The adjacent pixel/pattern extraction circuit 32 in this embodiment first judges whether an absolute value of a difference signal between the average value of signals of peripheral pixels G1 and G5 in an up-and-down direction and a signal of an adjacent pixel G0 is smaller than a threshold level LevN. When the absolute value is smaller, it can be determined that there is a correlation in the vertical direction. Further, likewise, presence/absence of a correlation is judged in regard to a right-and-left direction. If the correlation of one of the up-and-down direction and the right-and-left direction is recognized, this can be determined as a plus-sign-like pattern having a correlation with respect to the peripheral pixels in the plus-sign-like direction. In this case, a judgment value in the plus-sign-like direction Y01 is set to "1". Likewise, presence/absence of a correlation is judged in regard to two oblique directions. In case of a cross pattern having a correlation with respect to the peripheral pixels in the cross direction, a judgment value in the cross direction Y02 is set to "1".

When one of the judgment values in the plus-sign-like direction Y01 and the cross direction Y02 is "1" based on an output (a control signal Pkiz) from an OR circuit (a generating section) 32f, it is determined that the adjacent pixel G0 is not a defective pixel that is a judgment target pixel, and the respective judgment values are stored in an internal register (not shown) as respective pieces of pattern information (Y1=Y01, Y2=Y02). When both judgment values in the plus-sign-like direction Y01 and the cross direction Y02 are "0", the adjacent pixel G0 is determined as a defective pixel, and defective pixel substitution processing by a defective pixel/substitution processing circuit 33 depicted in FIG. 11 is carried out.

FIG. 11 is a view for explaining an operation by the defective pixel/substitution processing circuit 33 in the defective correction circuit 31. The defective pixel/substitution processing circuit 33 according to this embodiment selects peripheral pixels R1, R3, R5, and R7 in the plus-sign-like direction or peripheral pixels R2, R4, R6, and R8 in the cross direction from signals of the peripheral eight pixels R1 to R8 having the same color as a defective pixel R0 in accordance with the obtained pieces of pattern information Y1 and Y2. For example, when the pattern information 1 alone is "1", the peripheral pixels R1, R3, R5, and R7 in the plus-sign-like direction are selected. Additionally, for example, when the pattern information Y2 alone is "1", the peripheral pixels R2, R4, R6, and R8 in the cross direction are selected. However, when both pieces of pattern information Y1 and Y2 are "1", the peripheral pixels R1, R3, R5, and R7 in the plus-sign-like direction which are close to the defective pixel R0 in distance are selected.

As subsequent processing, the same processing as the defective pixel substitution processing depicted in FIG. 6 is executed, for example. As a result, the circuit scale can be reduced, and highly accurate defective pixel correction processing can be realized.

Seventh Embodiment

Figure 12:
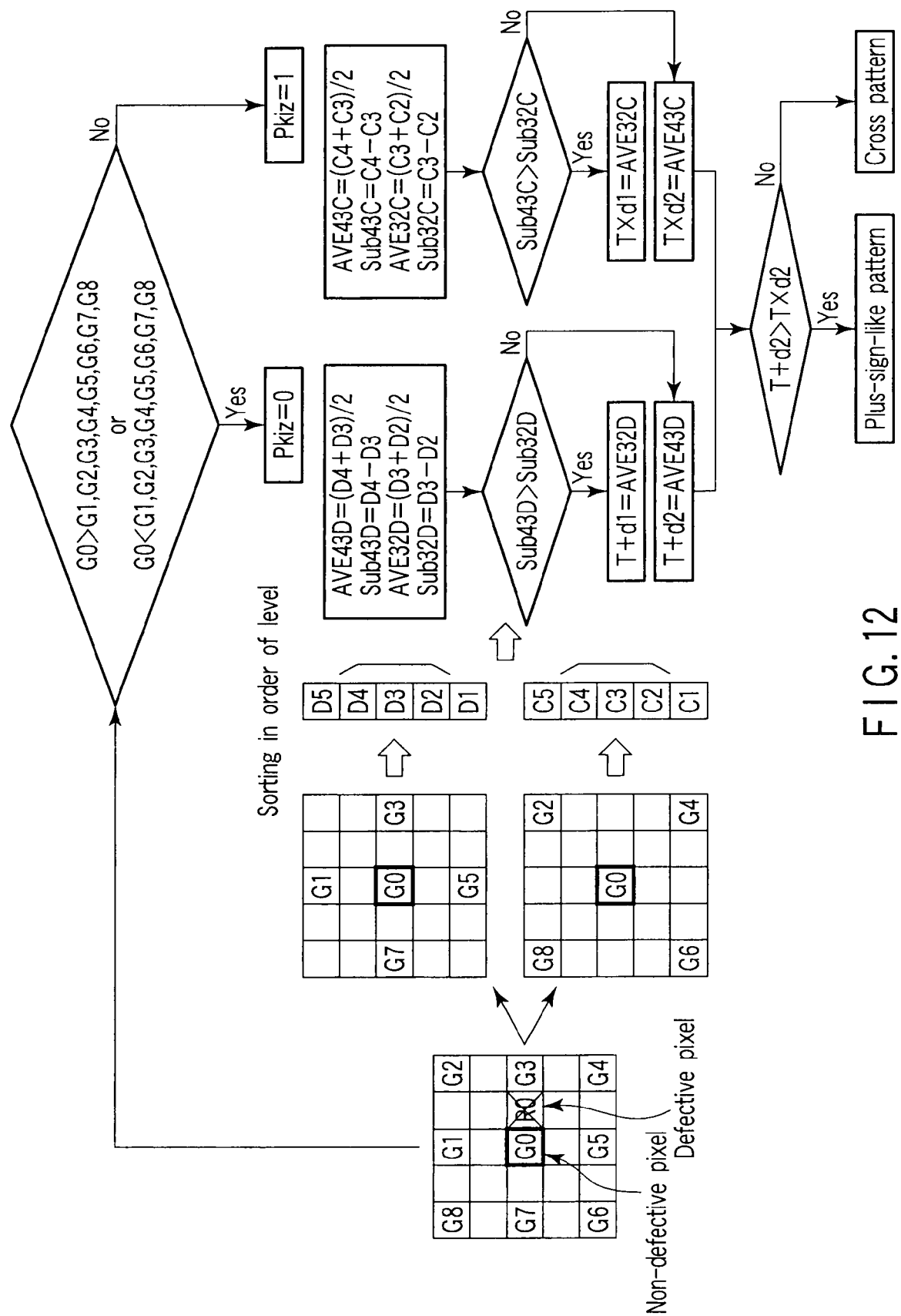
FIG. 12 is a view for explaining an operation of an adjacent pixel/pattern extraction circuit according to a seventh embodiment of the present invention.

FIG. 12 is a view for explaining an operation of an adjacent pixel/pattern extraction circuit 32 in a defect correction circuit 31 according to a seventh embodiment of the present invention. In this embodiment, a description will be given as to an example where an image pattern is extracted based on whether respective signals of peripheral eight pixels G1 to G8 having the same color as an adjacent pixel G0 are lager or smaller than a signal of the adjacent pixel G0. It is to be noted that a detailed explanation on tautological parts will be omitted.

The adjacent pixel/pattern extraction circuit 32 in this embodiment first judges whether the adjacent pixel G0 is a defective pixel as a judgment target pixel. For example, a signal of the adjacent pixel G0 is compared with respective signals of the peripheral eight pixels G1 to G8 having the same color as the adjacent pixel G0. When the signal of the adjacent pixel G0 is a maximum value (D5 or C5) or a minimum value (D1 or C1) including the respective signals of the peripheral pixels G1 to G8, the adjacent pixel G0 is determined as a defective pixel. A control signal Pkiz=0 is set when the adjacent pixel G0 is a defective pixel, and the control signal Pkiz=1 is set when the same is not a defective pixel.

Subsequently, the signals of the five pixels, i.e., the adjacent pixel G0 and the peripheral pixels G1, G3, G5, and G7 in a plus-sign-like direction are sorted in order of level, and each difference signal (each absolute value) Sub43D or Sub32D between signals of two pixels having intermediate values D4, D3, and D2 excluding the maximum value D5 and the minimum value D1 and each averaged signal AVE43D or AVE32D are obtained. Further, the average value T+d1 of a smaller one of the difference signals is determined as "AVE32D". Furthermore, the average value T+d2 of a larger one of the difference signals is determined as "AVE43D".

Likewise, the signals of the five pixels, i.e., the adjacent pixel G0 and the peripheral pixels G2, G4, G6, and G8 in a cross direction are sorted in order of level, and each difference signal (each absolute value) Sub43C or Sub32C between signals of two pixels having intermediate values C4, C3, and C2 excluding the maximum value C5 and the minimum value C1 and each averaged signal AVE43C or AVE32C are obtained. Furthermore, the average value Txd1 of a smaller one of the difference signals is determined as "AVE32C". Moreover, the average value Txd2 of a larger one of the difference signals is determined as "AVE43C".

Then, selecting a smaller one or a lager one of the obtained average values T+d2 and Txd2 of the larger signals enables judging which one of the peripheral pixels G1, G3, G5, and G7 in the plus-sign-like direction and the peripheral pixels G2, G4, G6, and G8 in the cross direction that the adjacent pixel G0 has a stronger correlation. When a plus-sign-like pattern having a stronger correlation with respect to the peripheral pixels G1, G3, G5, and G7 in the plus-sign-like direction is recognized, a judgment value in the Y01 direction is set to "1", and a judgment value in the Y02 direction is set to "0". In contrast, when a cross pattern having a stronger correlation with respect to the peripheral pixels G2, G4, G6, and G8 in the cross direction is recognized, the judgment value in the Y01 direction is set to "0", and the judgment value in the Y02 direction is set to "1".

As subsequent processing, the same processing as the defective pixel substitution processing depicted in FIG. 11 is executed, for example. As a result, the circuit scale can be reduced, and highly accurate defective pixel correction processing can be realized.

It is to be noted that the defective pixel/substitution processing circuit 33 depicted in FIG. 11 may be configured to simply select signals of peripheral pixels R1, R3, R5, and R7 in the plus-sign-like direction or peripheral pixels R2, R4, R6, and R8 in the cross direction in accordance with respective pieces of pattern information Y1 (=Y01) and Y2 (=Y02).

Alternatively, simply selecting a smaller one of differences of an intermediate value D4-D2 and an intermediate value C4-C2 enables selecting the plus-sign-like pattern or the cross pattern.

Eighth Embodiment

Figure 13:
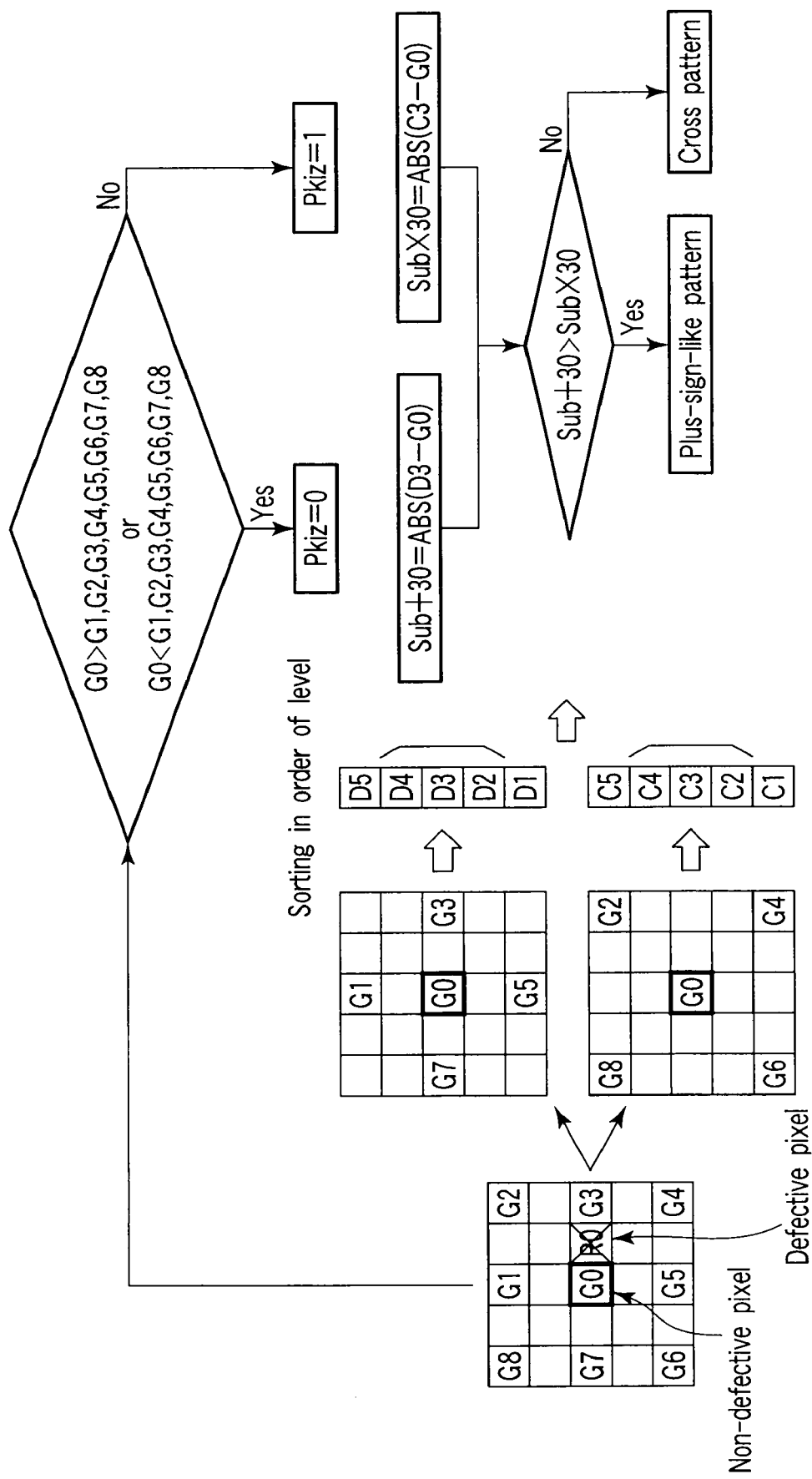
FIG. 13 is a view for explaining an operation of an adjacent pixel/pattern extraction circuit according to an eighth embodiment of the present invention.

FIG. 13 is a view for explaining an operation of an adjacent pixel/pattern extraction circuit 32 in a defect correction circuit 31 according to an eighth embodiment of the present invention. In this embodiment, a description will be given as to another method when an image pattern is extracted based on whether respective signals of peripheral eight pixels G1 to G8 having the same color as that of an adjacent pixel G0 are larger or smaller than a signal of the adjacent pixel G0. It is to be noted that a detailed explanation on tautological parts will be omitted.

The adjacent pixel/pattern extraction circuit 32 in this embodiment first judges whether the adjacent pixel G0 is a defective pixel as a judgment target pixel. For example, the signal of the adjacent pixel G0 is compared with each of the signals of the peripheral eight pixels G1 to G8 having the same color as that of the adjacent pixel G0. When the adjacent pixel G0 is a defective pixel, a control signal Pkiz=0 is set. When the same is not a defective pixel, the control signal Pkiz=1 is set.

Subsequently, the signals of the five pixels, i.e., the adjacent pixel G0 and the peripheral pixels G1, G3, G5, and G7 in a plus-sign-like direction are sorted in order of level to obtain a difference signal (an absolute value) Sub+30 between a median value D3 and the signal of the adjacent pixel G0. Likewise, the signals of the five pixels, i.e., the adjacent pixel G0 and the peripheral pixels G2, G4, G6, and G8 in a cross direction are sorted in order of level to obtain a difference signal (an absolute value) Sub×30 between a median value C3 and the signal of the adjacent pixel G0.

Further, selecting a smaller one or a larger one of the obtained difference signals Sub+30 and Sub×30 enables judging which one of the peripheral pixels G1, G3, G5, and G7 in the plus-sign-like direction and the peripheral pixels G2, G4, G6, and G8 in the cross direction a stronger correlation is provided to. When a plus-sign-like pattern having a stronger correlation with respect to the peripheral pixels G1, G3, G5, and G7 in the plus-sign-like direction is recognized, a judgment value in the Y01 direction is set to "1", and a judgment value in the Y02 direction is set to "0". In contrast, when a cross pattern having a stronger correlation with respect to the peripheral pixels G2, G4, G6, and G8 in the cross direction is recognized, the judgment value in the Y01 direction is set to "0", and the judgment value in the Y02 direction is set to "1".

As subsequent processing, the same processing as the defective pixel substitution processing as depicted in FIG. 11 is executed, for example. As a result, the circuit scale can be reduced, and highly accurate defective pixel correction processing can be realized.

It is to be noted that the defective pixel/substitution processing circuit 33 depicted in FIG. 11 may be configured to simply select signals of peripheral pixels R1, R3, R5, and R7 in the plus-sign-like direction or the peripheral pixels R2, R4, R6, and R8 in the cross direction in accordance with respective pieces of pattern information Y1 (=Y01) and Y2 (=Y02).

Ninth Embodiment

Figure 14:
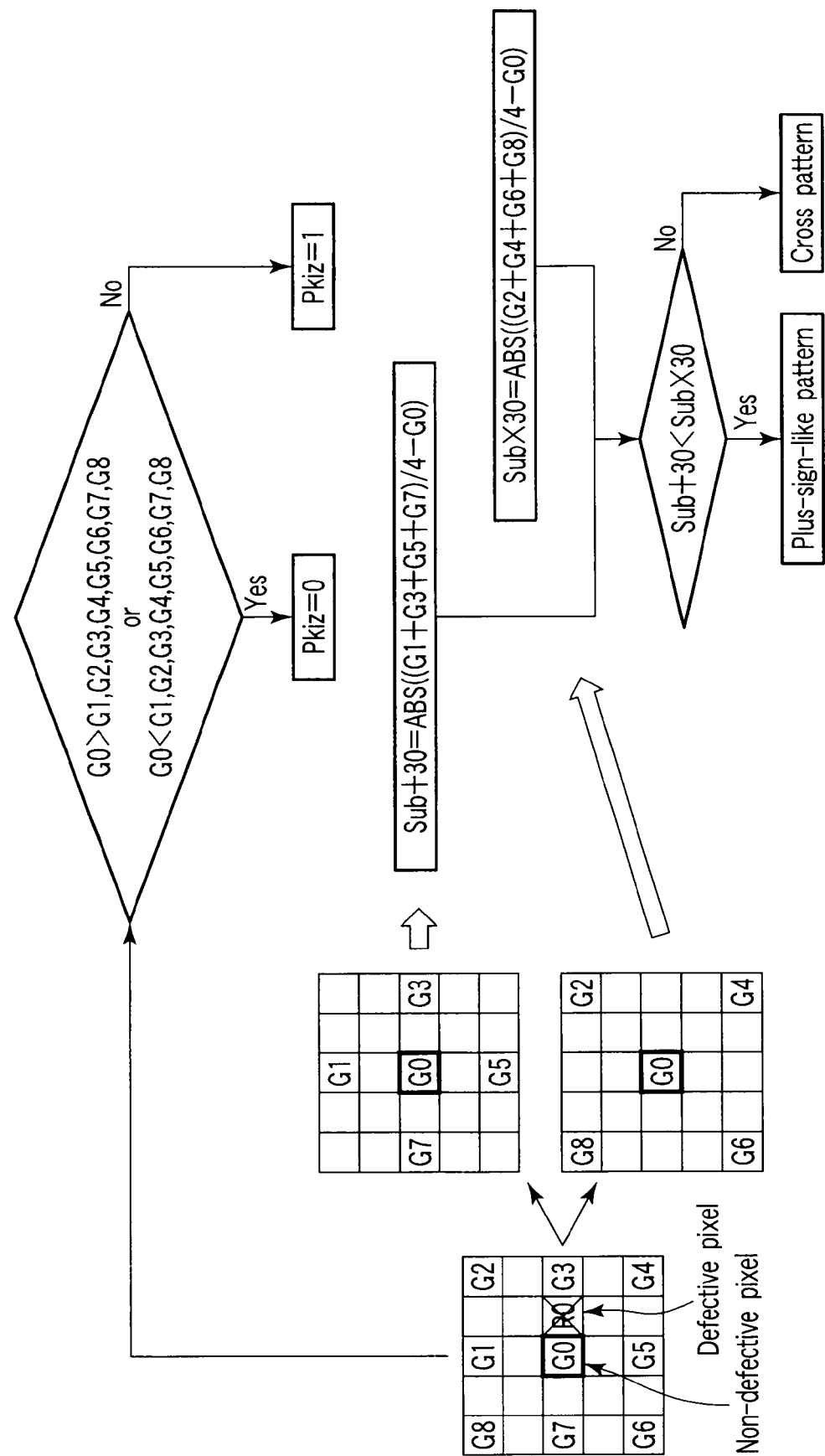
FIG. 14 is a view for explaining an operation of an adjacent pixel/pattern extraction circuit according to a ninth embodiment of the present invention.

FIG. 14 is a view for explaining an operation of an adjacent pixel/pattern extraction circuit 32 in a defect correction circuit 31 according to a ninth embodiment of the present invention. In this embodiment, a description will be given to still another method when an image pattern is extracted based on whether respective signals of peripheral eight pixels G1 to G8 having the same color as an adjacent pixel G0 are larger or smaller than a signal of the adjacent pixel G0. It is to be noted that a detailed explanation of tautological parts will be omitted.

The adjacent pixel/pattern extraction circuit 32 according to this embodiment first judges whether the adjacent pixel G0 is a defective pixel as a judgment target pixel. For example, a signal of the adjacent pixel G0 is compared with respective signals of the peripheral eight pixels G1 to G8 having the same color as that of the adjacent pixel G0. When the adjacent pixel G0 is a defective pixel, a control signal Pkiz=0 is set. When the same is not a defective pixel, the control signal Pkiz=1 is set.

Subsequently, the average value of the signals of the four pixels, i.e., the peripheral pixels G1, G3, G5, and G7 in a plus-sign-like direction which are close to the adjacent pixel G0 is obtained. Alternatively, the average value of signals of five pixels including the pixel G0. A difference signal (an absolute value) Sub+30 between the average value and the signal of the adjacent pixel G0 is obtained. Likewise, the average value of the signals of the four pixels, i.e., the peripheral pixels G2, G4, G6, and G8 in a cross direction which are close to the adjacent pixel G0 is obtained. Alternatively, the average value of signals of five pixels including the pixel G0.

A difference signal (an absolute value) Sub×30 between the average value and the signal of the adjacent pixel G0 is obtained.

Moreover, selecting a smaller one or a larger one of the obtained difference signals Sub+30 and Sub×30 enables judging which one of the peripheral pixels G1, G3, G5, and G7 in the plus-sign-like direction and peripheral pixels G2, G4, G6, and G8 in the cross direction a stronger correlation is provided to. When a plus-sign-like pattern having a stronger correlation with respect to the peripheral pixels G1, G3, G5, and G7 in the plus-sign-like direction is recognized, a judgment value in the Y01 direction is set to "1", and a judgment value in the Y02 direction is set to "0". In contrast, when a cross pattern having a stronger correlation with respect to the peripheral pixels G2, G4, G6, and G8 in the cross direction is recognized, the judgment value in the Y01 direction is set to "0", and the judgment value in the Y02 direction is set to "1".

As subsequent processing, the same processing as the defective pixel substitution processing depicted in FIG. 11 is executed, for example.

In this embodiment, a circuit that is used to sort the signals in order of level is not required, and the circuit scale can be thereby further reduced. Moreover, since the average value of signals of four pixels is used for pattern extraction, random noise can be further reduced, and highly accurate defective pixel correction processing can be realized. In particular, the difference signal becomes small when the number of the peripheral pixels equal to the adjacent pixel G0 in signal level is increased, thus improving an accuracy for the difference signal.

It is to be noted that the defective pixel/substitution processing circuit 33 depicted in FIG. 11 may be configured to simply select signals of the peripheral pixels R1, R3, R5, and R7 in the plus-sign-like direction or the peripheral pixels R2, R4, R6, and R8 in the cross direction in accordance with respective pieces of pattern information Y1 (=Y01) and Y2 (=Y02).

10th Embodiment

Figure 15:
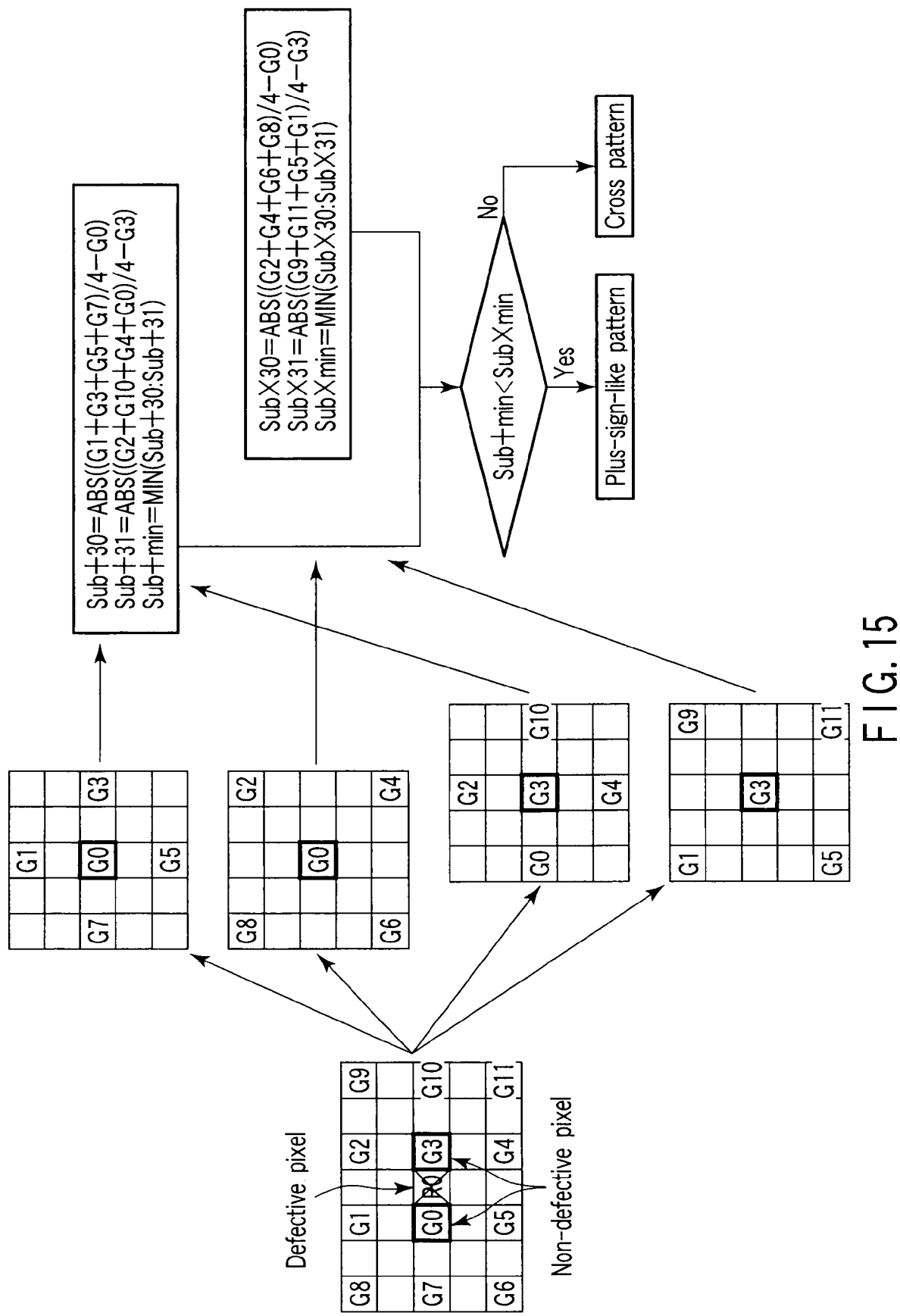
FIG. 15 is a view for explaining an operation of an adjacent pixel/pattern extraction circuit according to a 10th embodiment of the present invention.

FIG. 15 is a view for explaining an operation of an adjacent pixel/pattern extraction circuit 32 in a defect correction circuit 31 according to a 10th embodiment of the present invention. In this embodiment, a description will be given as to an example where an image pattern is extracted from left and right adjacent pixels G0 and G3 that are neighboring to a defective pixel R0 as a judgment target pixel in order to improve an accuracy for pattern extraction. It is to be noted that a detailed explanation on tautological parts will be omitted.

The adjacent pixel/pattern extraction circuit 32 according to this embodiment first calculates difference signals (absolute values) Sub+30 and Sub+31 between the adjacent pixels G0 and G3 on both sides of the defective pixel R0 and the average value of peripheral four pixels in a plus-sign-like direction, and determines a smaller one of these difference signals as Sub+min. Likewise, it calculates difference signals (absolute values) Sub×30 and Sub×31 between the adjacent pixels G0 and G3 and the average value of peripheral four pixels in a cross direction, and determines a smaller one of these difference signals as Sub×min.

Further, selecting a smaller one or a larger one of the obtained difference signals Sub+min and Sub×min enables judging which one of peripheral pixels G1, G3, G5, and G7 or G0, G2, G4 and G10 in the plus-sign-like direction and peripheral pixels G2, G4, G6 and G8 or G1, G5, G9, and G11 in the cross direction a stronger correlation is provided to.

When a plus-sign-like pattern having a stronger correlation with respect to the peripheral pixels G1, G3, G5, and G7 or G0, g2, G4, and G10 in the plus-sign-like direction is recognized, a judgment value in the Y01 direction is set to "1", and a judgment value in the Y02 direction is set to "0". In contrast, when a cross pattern having a stronger correlation with respect to the peripheral pixels G2, G4, G6, and G8 or G1, G5, G9, and G11 in the cross direction is recognized, the judgment value in the Y01 is direction is set to "0", and the judgment value in the Y02 direction is set to "1".

As subsequent processing, the same processing as the defective pixel substitution processing depicted in FIG. 11 is executed, for example.

It is to be noted that the defective pixel/substitution processing circuit depicted in FIG. 11 may be configured to simply select signals of peripheral pixels R1, R3, R5, and R7 or signals of the peripheral pixels R2, R4, R6, and R8 in accordance with respective pieces of pattern information Y1 (=Y01) and Y2 (=Y02).

Further, signals of upper and lower adjacent pixels Gb which are neighboring to the defective pixel R0 can be added to the pattern extraction processing.

Of course, in the first to 10th embodiments, increasing the number of non-defective pixels for pattern extraction enables improving an accuracy for pattern extraction.

11th Embodiment

Figure 16:
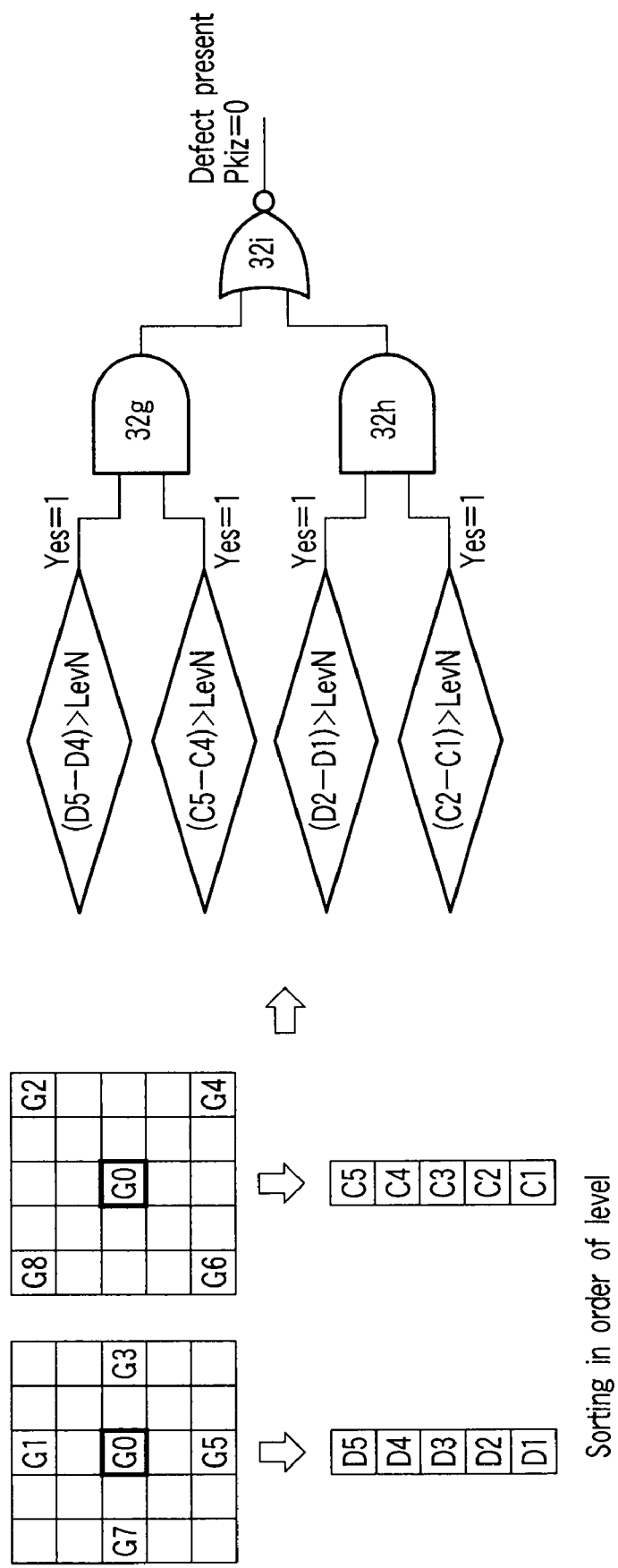
FIG. 16 is a view for explaining an operation of an adjacent pixel/pattern extraction circuit according to an 11th embodiment of the present invention.
Figure 18:
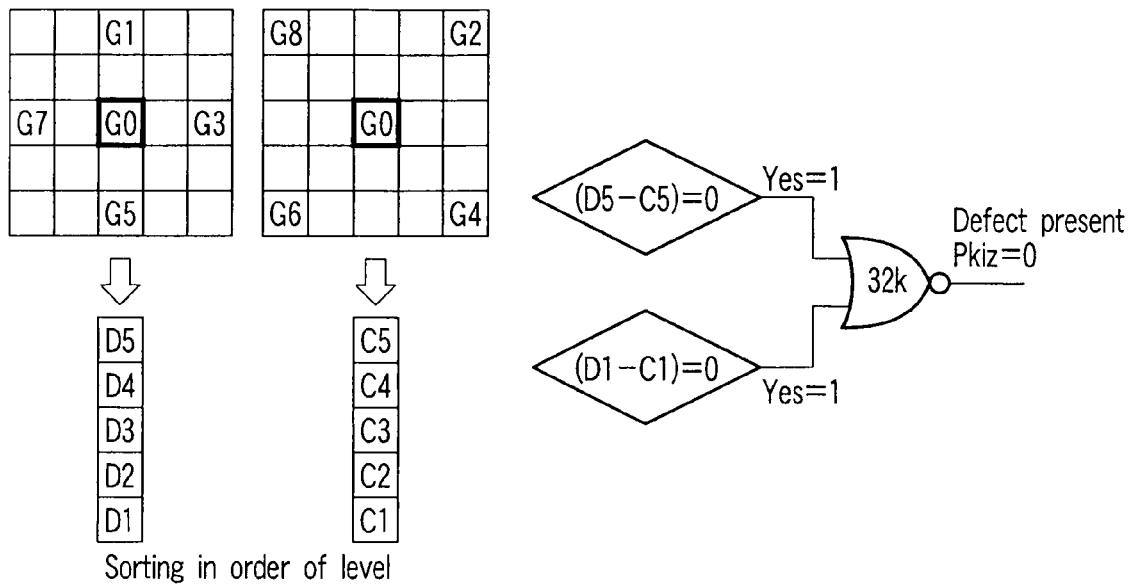
FIG. 18 is a view for explaining still another example of the adjacent pixel/pattern extraction circuit according to the 11th embodiment of the present invention.

FIGS. 16 to 18 are views for explaining an operation of an adjacent pixel/pattern extraction circuit 32 in a defect correction circuit 31 according to an 11th embodiment of the present invention. In this embodiment, a description will be given as to an example where checking presence/absence of a white defect and a black defect in extraction of an image pattern enables detecting a defective pixel as a judgment target pixel. It is to be noted that a detailed explanation of tautological parts will be omitted.

The adjacent pixel/pattern extraction circuit 32 depicted in FIG. 16 first judges whether an adjacent pixel G0 is a defective pixel. For example, signals of five pixels, i.e., the adjacent pixel G0 and peripheral pixels G1, G3, G5, and G7 in a plus-sign-like direction are sorted in order of level (D5 to D1). Likewise, signals of five pixels, i.e., the adjacent pixel G0 and peripheral pixels G2, G4, G6, and G8 in a cross direction are sorted in order of level (C5 to C1).

Furthermore, a judgment is made upon whether an absolute value of a difference signal between a maximum value D5 of the sorted signals and an intermediate value D4 whose level is the second to the former value is larger than a threshold level LevN. When the absolute value is larger, it is determined that a pixel having the maximum value D5 may possibly have a white defect. Likewise, a judgment is made upon whether an absolute value of a difference signal between a maximum value C5 and an intermediate value C4 whose level is the second to the former value is larger than the threshold level. When the absolute value is larger, it is determined that a pixel having the maximum value C5 may possibly have a white defect. When the possibility of the white defect is determined from the absolute values of the two difference signals, an output from an AND circuit 32g finally becomes "1", and it is determined that the five pixels G0, G1, G3, G5, and G7 in the plus-sign-like direction have white defects.

Moreover, a judgment is made upon whether an absolute value of a difference signal between a minimum value D1 of the sorted signals and an intermediate value D2 whose level is the second to the former value D1 is larger than the threshold level LevN. When the absolute value is larger, it is determined that a pixel having the minimum value D1 may possibly have a black defect. Likewise, a judgment is made upon whether an absolute value of a difference signal between a minimum value C1 and an intermediate value C2 whose level is the second to the former value is larger than the threshold level LevN. When the absolute value is larger, it is determined that a pixel having the minimum value C1 may possibly have a black defect. When the possibility of the black defect is determined from the absolute values of the two difference signals, an output from an AND circuit 32h finally becomes "1", and it is determined that the five pixels G0, G2, G4, G6, and G8 in the cross direction have black defects.

In this manner, when at least one of the white defect and the black defect is detected, an output Pkiz (a control signal) from an NOR circuit 32i becomes "0", and the adjacent pixel G0 is determined as a defective pixel.

The adjacent pixel/pattern extraction circuit 32 depicted in FIG. 17 first sorts signals of five pixels, i.e., an adjacent pixel G0 and peripheral pixels G1, G3, G5, and G7 in a plus-sign-like direction and signals of five pixels, i.e., the adjacent pixel G0 and peripheral pixels G2, G4, G6, and G8 in the cross direction in order of level.

Additionally, a judgment is made upon whether an absolute value of a difference signal between the average value of maximum values D5 and C5 of the sorted signals and the average value of intermediate values D4 and C4 whose levels are the second to these values is larger than a threshold level LevN. When the absolute value is larger, it is determined that pixels having the maximum values D5 and C5 have white defects. Likewise, a judgment is made upon whether an absolute value of a difference signal between the average value of minimum values D1 and C1 and the average value of intermediate values D2 and C2 whose levels are the second to these values is larger than the threshold level LevN. When the absolute value is larger, it is determined that pixels having the minimum values D1 and C1 have black defects.

When at least either the white defects or the black defects are detected in this manner, an output Pkiz (a control signal) from an NOR circuit 32j becomes "0", and the adjacent pixel G0 is determined as a defective pixel.

The adjacent pixel/pattern extraction circuit 32 depicted in FIG. 18 first sorts signals of five pixels, i.e., an adjacent pixel G0 and peripheral pixels G1, G3, G5, and G7 in a plus-sign-like direction and signals of five pixels, i.e., the adjacent pixel G0 and peripheral pixels G2, G4, G6, and G8 in a cross direction in order of level.

Furthermore, a judgment is made upon whether an absolute value of a difference signal between maximum values D5 and C5 of the sorted signals is "0". When the absolute value is "0", it is determined that pixels having the maximum values D5 and C5 have white defects. Likewise, a judgment is made upon whether an absolute value of a difference signal between minimum values D1 and C1 is "0". When the absolute value is "0", it is determined that pixels having the minimum values D1 and C1 have black defects.

When at least either the white defects or the black defects are detected in this manner, an output Pkiz (a control signal) from an NOR circuit 32k becomes "0", and the adjacent pixel G0 is determined as a defective pixel.

As explained above, according to this embodiment, in any structure, a circuit required to judge a defective pixel can be greatly simplified.

12th Embodiment

Figure 19:
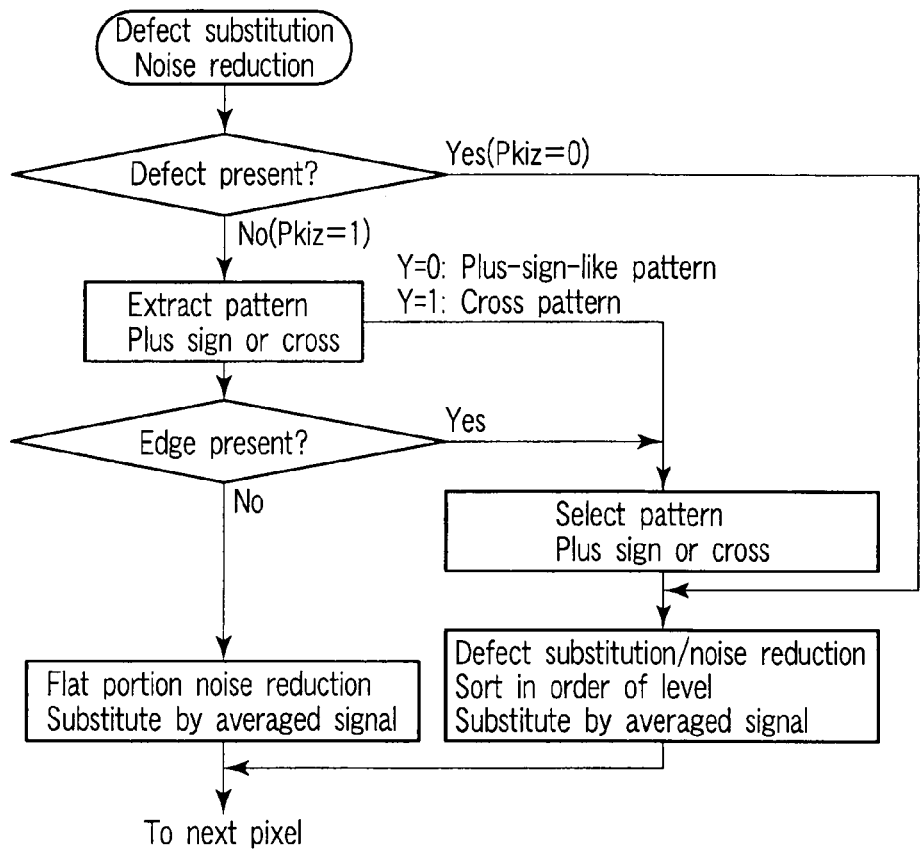
FIG. 19 is a flowchart for explaining an operation of a defect correction circuit according to a 12th embodiment of the present invention.

FIG. 19 is a view for explaining an operation of a defect correction circuit 31 according to a 12th embodiment of the present invention. In this embodiment, a description will be given as to an example where processing for noise reduction is further carried out in addition to the defective pixel substation processing. It is to be noted that a detailed explanation on tautological parts will be omitted.

The defect correction circuit 31 according to this embodiment first judges whether a defective pixel as a judgment target pixel is present. The adjacent pixel/pattern extraction circuit 32 according to the seventh embodiment (see FIG. 12) or the adjacent pixel/pattern extraction circuit 32 according to the 11th embodiment (see FIGS. 16 to 18) can be utilized for the judgment on a defective pixel, for example.

Then, based on a result of the judgment on a defective pixel, image pattern extraction or defect substitution/noise reduction processing is executed. The adjacent pixel/pattern extraction circuit 32 according to the sixth embodiment (see FIG. 10), the adjacent pixel/pattern extraction circuit 32 according to the seventh embodiment (see FIG. 12), the adjacent pixel/pattern extraction circuit 32 according to the eighth embodiment (see FIG. 13), or the adjacent pixel/pattern extraction circuit 32 according to the ninth embodiment (see FIG. 14) can be utilized for image pattern extraction, for example.

Subsequently, an edge portion of an image pattern is detected based on a result of the image pattern extraction. When the edge portion is not detected, flat portion noise reduction processing is executed. To perform detection of the edge portion of the image pattern and flat portion noise reduction, a plus-sign-like pattern or a cross pattern is first selected based on a result of the image pattern extraction as shown in FIG. 20, for example.

An example where the plus-sign-like pattern is selected will be explained hereinafter. When the plus-sign-like pattern is selected, signals of five pixels, i.e., an adjacent pixel G0 and peripheral four pixels G1, G3, G5, and G7 which are adjacent to the former pixel in a plus-sign-like direction and hence the same color are sorted in order of level. Further, a difference signal (an absolute value) between a maximum value D5 and a minimum value D1 of the sorted signals is determined as Sub51.

Then, the difference signal Sub51 is compared with a threshold level LevN. When the difference signal Sub51 is determined to be larger, it is determined that the adjacent pixel G0 corresponds to an edge portion of an image pattern. In contrast, when the difference signal Sub51 is determined to be smaller, it is determined that the adjacent pixel G0 corresponds to a flat portion of the image pattern.

As the flat portion noise reduction processing, for example, the signal of the adjacent pixel G0 is quadrupled for weighting, and the averaged signal G0' of this quadrupled value and respective signals of the peripheral four pixels G1, G3, G5, and G7 in the plus-sign-like direction is calculated. Furthermore, this averaged signal G0' substitutes for a signal of a defective pixel R0.

It is to be noted that the averaged signal G0' may be calculated without weighting the signal of the adjacent pixel G0, and a gain for weighting can be arbitrarily set.

Moreover, an averaged signal of intermediate values D4, D3, and D2 excluding the maximum value D5 and the minimum value D1 of the signals sorted in order of level may substitute for the signal of the defective pixel.

On the other hand, when the edge portion of the image pattern is detected, use of, e.g., the defective pixel/substitution processing circuit 33 depicted in FIG. 11 and the defective pixel substitution processing can reduce random noise at the edge portion.

When the defective pixel substitution processing and the noise reduction processing can be simultaneously executed, a circuit for extraction of an image pattern, a circuit for substitution processing, and others can be used as a common circuit, thereby greatly reducing the circuit scale.

13th Embodiment

Figure 21:
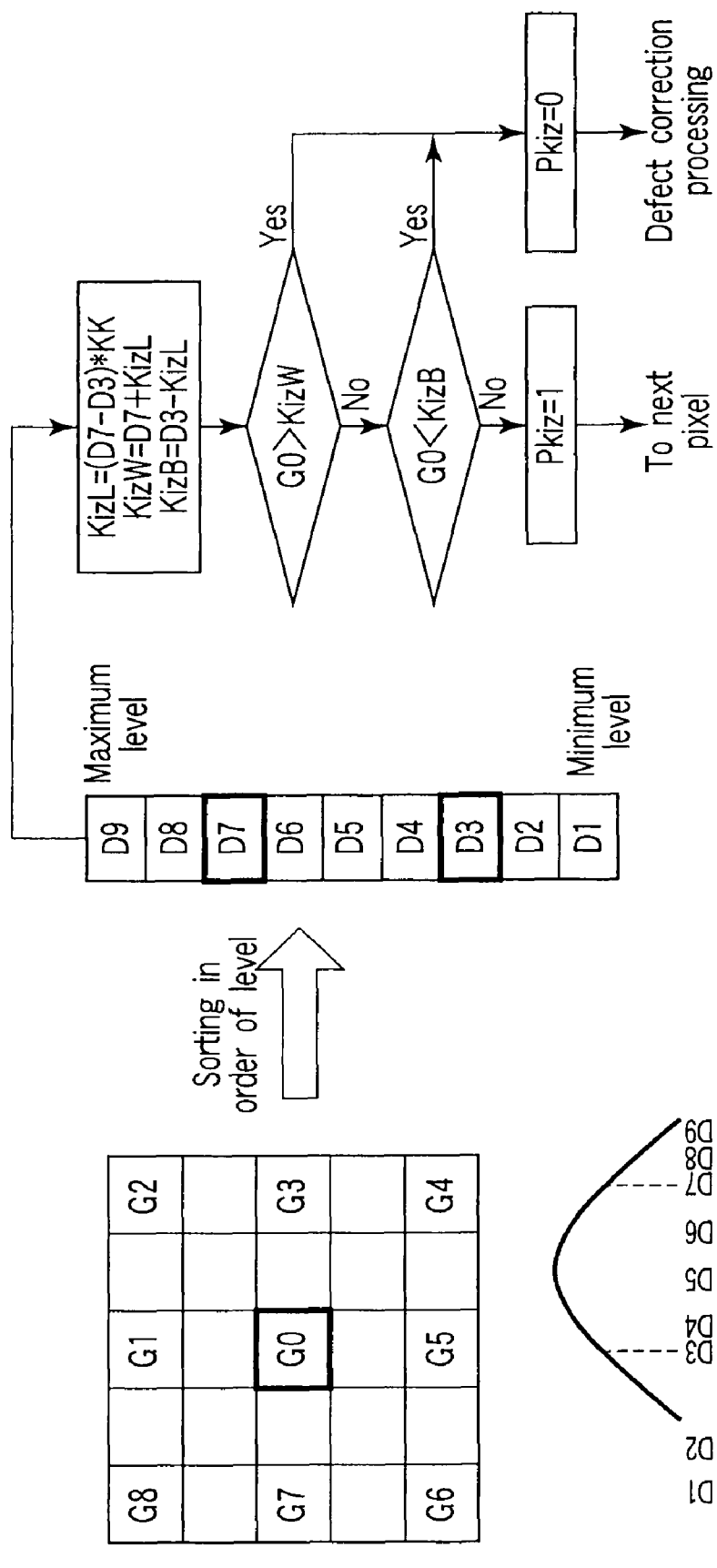
FIGS. 21 and 22 are views for explaining an operation of adjacent pixel/pattern extraction circuit 32 in the defect correction circuit 31 according to a 13th embodiment of the present invention.
Figure 22:
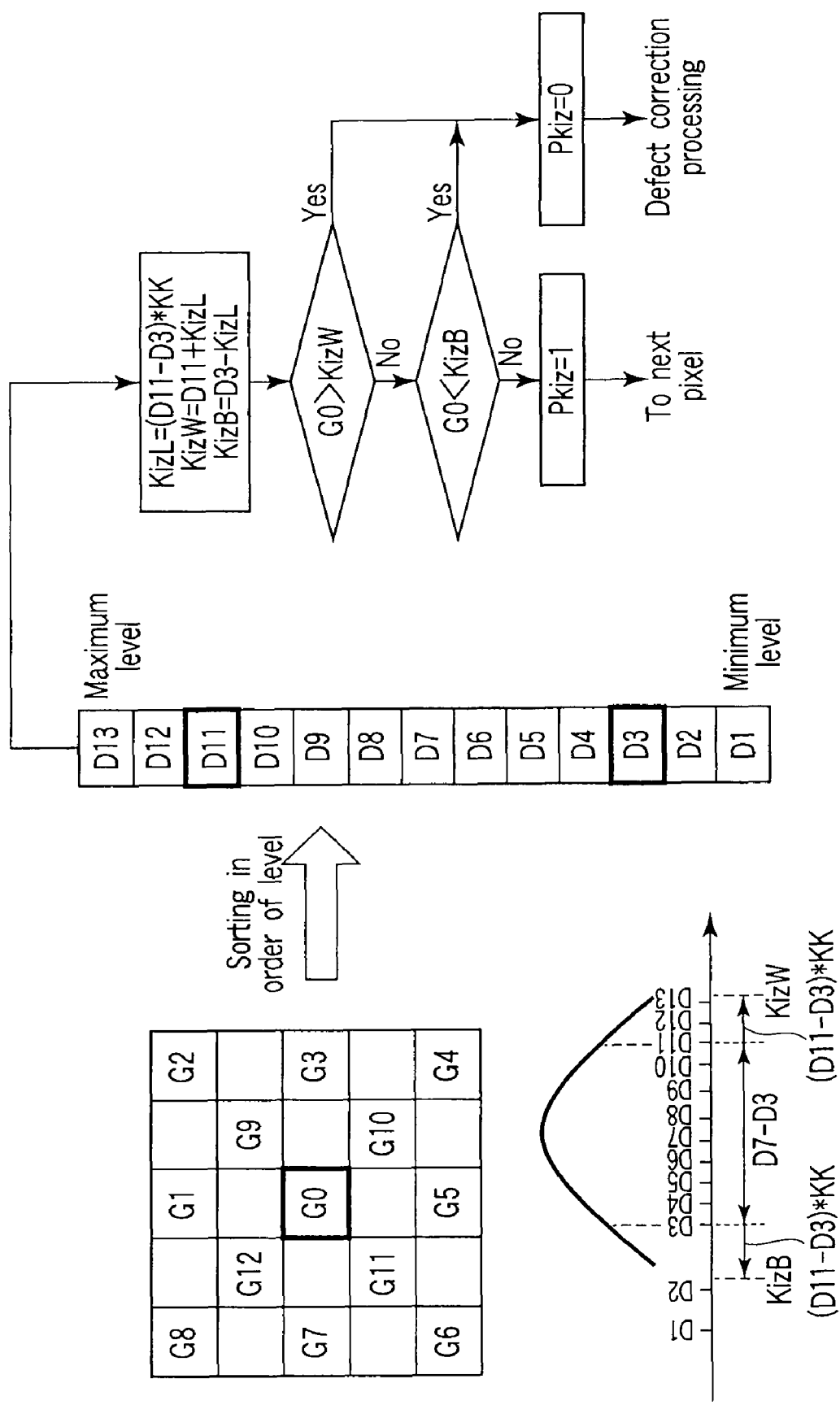

FIGS. 21 and 22 are views for explaining an operation of adjacent pixel/pattern extraction circuit 32 in the defect correction circuit 31 according to a 13th embodiment of the present invention. In this embodiment, description will be given as to the case where the presence of white defects and black defects are examined to detect the defect pixel as a judgment target with a high accuracy. It is to be noted that a detailed explanation on tautological parts will be omitted.

The adjacent pixel/pattern extraction circuit 32 shown in FIG. 21 judges whether the adjacent pixel G0 is a defective pixel. For example, the adjacent pixel G0 and the peripheral eight pixel having the same color as the adjacent pixel are sorted in order of level (D9 to D1). In this embodiment, processing to detect two white defect pixels and two black defect pixels is explained. First, a difference between the third largest D7 and the third smallest D3 is calculated. Then, the difference result is multiplied by a assumed standard deviation level KKK to obtain a defect judgment level KizL. For the white defect level, KizW obtained by adding KizL to D7 is the judgment level. For the black defect level, KizB obtained by subtracting KizL from D3 is the judgment level. Then, whether G0 is larger than KizW is determined. If G0 is larger than KizW, G0 is determined as a white defect and output Pkiz (control signal) is set "0". If G0 is smaller than KizW, G0 is further determined to be smaller than KizB or not. If G0 is smaller than KizB, G0 is determined as a black defect and output Pkiz (control signal) is set "0". If G0 is larger than KizB, the pixel is determined to be neither a white defect nor black defect and output Pkiz (control signal) is set "1". This processing involves generation of virtual standard deviation from D3 and D7 and detection of a pixel that deviates from the standard deviation as a defect pixel.

When the threshold level LevN is defined as in the 11th embodiment, it is difficult to adjust between an object having fine patterns and one without such patterns. When the object without fine patterns is used to define a threshold level LevN, fine patterns are determined to be defective, causing fine resolution part to deteriorate. On the other hand, when the threshold level is defined to allow fine patterns to be reproduced, tiny white defects and black defects in an object without fine patterns cannot be corrected, deteriorating the image quality. Therefore, it has been very difficult to define the threshold level LevN. In the present embodiment, because the difference between D7 and D3 is small in objects without fine patterns or with little random noise, the virtual standard deviation is also small to allow for detection of defect pixels with a small level. On the other hand, because the difference between D7 and D3 is large in objects with much random noise or many fine patterns, the virtual standard deviation is also large. Therefore, small resolution part is not determined as defect pixel, avoiding deterioration of resolution. FIG. 21 can also be applied to R pixels or B pixels.

FIG. 22 shows usage of thirteen G pixels in order to improve accuracy of detection of G pixels. Processing in FIG. 22 is as same as that in FIG. 21. It is possible to deal with one white defect pixel and one black defect pixels. In such a case, the assumed standard deviation is set small.

It is to be noted that the example where the color filter arrangement of the color filters is the Bayer arrangement has been explained in each of the foregoing embodiments. The present invention can be likewise applied to a structure having the color filter arrangement of WRGB with a transparent color filter (white) and a filter arrangement in which each pixel of RGB has an angle of 45 degrees (which is also called a honeycomb arrangement) and others without being restricted to the above structure. Furthermore, the embodiments can be applied to the pixel arrangement in which pixels adjacent in the row or column direction are shifted by half a pixel from each other.

The basic arrangement of the color filter is not limited to a 2×2 matrix and can be applied to bigger matrixes.

The extraction of the pattern information is not limited to from the adjacent pixel and a pixel away from the target one by one pixel or more can be used.

Moreover, the present invention is not restricted to the CMOS color image sensor and can be applied to a monochrome sensor.

Additionally, when the threshold level can be changed in accordance with, e.g., a signal amount and/or a gain of an analog circuit, a further optimum judgment can be made. For example, the threshold level LevN is controlled to a value assuming circuit noise when a light quantity is low, and it is increased in accordance with shot noise when a light quantity is high. Adopting such control enables realizing effective processing for suppression of random noise.

In particular, when correcting shading due to optical characteristics of the lens 10, each signal is amplified by using a digital gain as getting closer to upper and lower ends, right and left ends, and corner portions with respect to the center of a screen. Therefore, random noise at the upper and lower ends, the right and left ends, and the corner portions of the screen is increased. Thus, when the threshold level LevN is controlled to be increased at the upper and lower ends, the right and left ends, and the corner portions of the screen in accordance with this digital gain, a noise suppression effect can be increased, thereby improving an image quality.

Changing the threshold level LevN in many ways in accordance with, e.g., a signal amount, a screen position, color information, or gain information, optimum defect correction can be performed.

Additionally, the present invention is not restricted to the CMOS image sensor and it can be likewise applied to, e.g., a charge coupled device (CCD) or a laminated sensor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus which uses a defect correction circuit to perform predetermined signal processing with respect to image signals respectively output from an imaging section in which a plurality of pixels each formed of a photoelectric transducer with a color filter provided thereon are two-dimensionally arranged,
wherein the defect correction circuit includes:
a pattern extraction circuit which extracts image pattern information based on a signal of an adjacent pixel that is adjacent to a judgment target pixel and signals of peripheral pixels that are placed around the adjacent pixel with the adjacent pixel as the center and have the same color as the adjacent pixel in the image signals, the peripheral pixels excluding the judgment target pixel;

a substitution circuit which substitutes a signal of the judgment target pixel by signals of peripheral pixels that are close to the judgment target pixel and have the same color as the judgment target pixel; and wherein the pattern extracting circuit performs:

sorting the signal of the judgment target pixel and signals of peripheral pixels having the same color as the judgment target pixel in order of level;

calculating a subtraction result by subtracting a signal at a predetermined rank excluding a smallest one in a smaller signal side from a signal at a predetermined rank excluding a largest one in a larger signal side and multiplying the subtraction result by a predetermined coefficient to obtain a first signal;

adding the first signal to the signal at a predetermined rank in a larger signal side to obtain a second signal;

subtracting the first signal from the signal at a predetermined rank in a smaller signal side to obtain a third signal;

determining whether the signal of the judgment target pixel is larger than the second signal;

determining whether the signal of the judgment target pixel is smaller than the third signal; and producing a control signal to control the substitution circuit in accordance with determination.

2. The imaging apparatus according to claim 1, wherein a color filter arrangement is a tetragonal arrangement based on R, G and B colors.

3. The imaging apparatus according to claim 1, wherein a color filter arrangement is an inclined arrangement which is based on a R, G and B colors and inclined at 45 degrees in arrangement.

4. The imaging apparatus according to claim 1, wherein the pattern extraction circuit includes:

difference signal calculation processing of calculating a difference signal between the signal of the adjacent pixel and each of the signals of the peripheral pixels;

level judgment processing of determining that a signal of a corresponding peripheral pixel is equal to the signal of the adjacent pixel in level when the difference signal is smaller than a predetermined threshold level; and extraction processing of extracting the image pattern information that is supplied to the substitution circuit depending on a direction of the adjacent pixel along which the peripheral pixel having the signal equal to the signal of the adjacent pixel in level is present.

5. The imaging apparatus according to claim 4, wherein the pattern extraction circuit further includes a generating section that generates a control signal that is used to control the substitution circuit based on a result of the level judgment processing with respect to each of the signals of the peripheral pixels, and the control signal is generated to execute substitution processing for the adjacent pixel when the signals of all the peripheral pixels are not equal to the signal of the adjacent pixel in level.

6. The imaging apparatus according to claim 4, wherein the pattern extraction circuit extracts the image pattern information in eight directions of an upper direction, a lower direction, a left direction, a right direction, an upper left direction, a lower left direction, an upper right direction, and a lower right direction of the adjacent pixel to control the substitution circuit.

7. The imaging apparatus according to claim 6, wherein the substitution circuit substitutes the signal of the judgment target pixel by a signal of each peripheral pixel close to the judgment target pixel and having the same color as the judgment target pixel selected based on the image pattern information or the average value of the signals of the peripheral pixels close to the judgment target pixel and having the same color as the judgment target pixel.

8. The imaging apparatus according to claim 4, wherein the pattern extraction circuit extracts the image pattern information in four directions of an up-and-down direction, a right-and-left direction, a direction from top left to bottom right, and a direction from upper right to lower bottom of the adjacent pixel to control the substitution circuit.

9. The imaging apparatus according to claim 8, wherein the pattern extraction circuit further judges a level relationship of difference signals between the signal of the adjacent pixel and two signals of corresponding peripheral pixels in each of the four directions, and selects the single signal of the peripheral pixel having the smaller difference signal.

10. The imaging apparatus according to claim 8, wherein the substitution circuit substitutes the signal of the judgment target pixel by the average signal of the signals of the peripheral pixels close to the judgment target pixel and having the same color as the judgment target pixel selected based on the image pattern information.

11. The imaging apparatus according to claim 8, wherein the substitution circuit sorts one signal of the judgment pixel and four signals of peripheral pixels close to the judgment target pixel in a plus-sign-like direction and having the same color as the judgment target pixel or four signals of peripheral pixels close to the judgment target pixel in an X-shaped direction and having the same color as the judgment target pixel selected based on the image pattern information in order of level, calculates a first averaged signal and a first difference signal from two signals having large levels and also calculates a second averaged signal and a second difference signal from two signals having small levels in three signals having intermediate values excluding a maximum value and a minimum value in the one signal of the judgment target pixel and the four signals of the peripheral pixels sorted in order of level, judges a level relationship between the first difference signal and the second difference signal, substitutes the one signal of the judgment target pixel by the first averaged signal when the second difference signal is larger than the first difference signal, and substitutes the one signal of the judgment pixel by the second averaged signal when the first difference signal is larger than the second difference signal.

12. The imaging apparatus according to claim 8, wherein the pattern extraction circuit judges whether difference signals between the signal of the adjacent pixel and two signals of corresponding peripheral pixels in each of the four directions are smaller than the threshold level, and selects the single signal of the peripheral pixel having the smaller difference signal.

13. The imaging apparatus according to claim 8, wherein the pattern extraction circuit further judges presence/absence of a correlation in the four directions based on whether a difference signal between the average value of two signals of corresponding peripheral pixels in each of the four directions and the signal of the adjacent pixel is smaller than the predetermined threshold level.

14. The imaging apparatus according to claim 4, wherein the pattern extraction circuit judges presence/absence of correlations with respect to two directions of a plus-sign-like direction including an up-and-down direction and a right-and-left direction and an X-shaped direction including a direction from top left to bottom right and a direction from top right to bottom left based on whether a difference signal between the average value of two signals of corresponding peripheral pixels in each of the four directions of the up-anddown direction, the right-and-left direction, the direction from top left to bottom right, and the direction from top right to bottom left of the adjacent pixel and the signal of the adjacent pixel is smaller than the predetermined threshold level, and extracts the image pattern information in the two direction to control the substitution circuit.

15. The imaging apparatus according to claim 1, wherein the pattern extraction circuit performs:
   sorting one signal of the adjacent pixel and four signals of peripheral pixels close to the adjacent pixel in a plus-sign-like direction and having the same color as the adjacent pixel in order of level, calculating a first averaged signal and a first difference signal from two signals having large levels and also calculating a second averaged signal and a second difference signal from two signals having small levels in three signals having intermediate values excluding a maximum value and a minimum value in the one signal of the adjacent pixel and the four signals of the peripheral pixels sorted in order of level, and selecting the first averaged signal when the second difference signal is smaller than the first difference signal;
   sorting one signal of the adjacent pixel and four signals of peripheral pixels close to the adjacent pixel in an X-shaped direction and having the same color as the adjacent pixel in order of level, calculating a third averaged signal and a third difference signal from two signals having large levels and also calculating a fourth averaged signal and a fourth difference signal from two signals having small levels in three signals having intermediate values excluding a maximum value and a minimum value in the one signal of the adjacent pixel and the four signals of the peripheral pixels sorted in order of level, and selecting the third averaged signal when the fourth difference signal is smaller than the third difference signal; and
   selecting a smaller one or a larger one of the first averaged signal and the third averaged signal to judge presence/absence of correlations in the two directions of the plus-sign-like direction and the X-shaped direction, and extracting the image pattern information in the two directions to control the substitution circuit.

16. The imaging apparatus according to claim 1, wherein the pattern extraction circuit performs:
   sorting one signal of the adjacent pixel and four signals of peripheral pixels close to the adjacent pixel in a plus-sign-like direction and having the same color as the adjacent pixel in order of level, and obtaining a first difference signal from one signal having a median value of the one signal of the adjacent pixel and the four signals of the peripheral pixels sorted in order of level and the one signal of the adjacent pixel;
   sorting the one signal of the adjacent pixel and four signals of peripheral pixels close to the adjacent pixel in an X-shaped direction and having the same color as the adjacent pixel in order of level, and obtaining a second difference signal from one signal having a median value of the one signal of the adjacent pixel and the four signals of the peripheral pixels sorted in order of level and the one signal of the adjacent pixel; and
   selecting a smaller one or a larger one of the first difference signal and the second difference signal to judge presence/absence of correlations in the two directions of the plus-sign-like direction and the X-shaped direction, and extracting the image pattern information in the two directions to control the substitution circuit.

17. The imaging apparatus according to claim 1, wherein the pattern extraction circuit performs:
   obtaining a first averaged signal from one signal of the adjacent pixel and four signals of peripheral pixels close to the adjacent pixel in a plus-sign-like direction and having the same color as the adjacent pixel, and calculating a first difference signal from the first averaged signal and the one signal of the adjacent pixel;
   obtaining a second averaged signal from the one signal of the adjacent pixel and four signals of peripheral pixels close to the adjacent pixel in an X-shaped direction and having the same color as the adjacent pixel, and calculating a second difference signal from the second averaged signal and the one signal of the adjacent pixel; and
   selecting a smaller one or a larger one of the first difference signal and the second difference signal to judge presence/absence of correlations in the two directions of the plus-sign-like direction and the X-shaped direction, and extracting the image pattern information in the two directions to control the substitution circuit.

18. The imaging apparatus according to claim 1, wherein the pattern extraction circuit performs:
   obtaining a first averaged signal from four signals of peripheral pixels close to the adjacent pixel in a plus-sign-like direction and having the same color as the adjacent pixel, and calculating a first difference signal from the first averaged signal and one signal of the adjacent pixel;
   obtaining a second averaged signal from four signals of peripheral pixels close to the adjacent pixel in an X-shaped direction and having the same color as the adjacent pixel, and calculating a second difference signal from the second averaged signal and the one signal of the adjacent pixel; and
   selecting a smaller one or a larger one of the first difference signal and the second difference signal to judge presence/absence of correlations in two directions of the plus-sign-like direction and the X-shaped direction, and extracting the image pattern information in the two directions to control the substitution circuit.

19. The imaging apparatus according to claim 1, wherein the pattern extraction circuit performs:
   obtaining a first averaged signal from four signals of peripheral pixels close to a first adjacent pixel neighboring to a judgment target pixel in a plus-sign-like direction and having the same color as the first adjacent pixel, and calculating a first difference signal from the first averaged signal and one signal of the first adjacent pixel;
   obtaining a second averaged signal from four signals of peripheral pixels close to a second adjacent pixel neighboring to the judgment target pixel in the plus-sign-like direction and having the same color as the second adjacent pixel, and calculating a second difference signal from the second averaged signal and one signal of the second adjacent pixel;
   selecting a smaller one of the first difference signal and the second difference signal as a third difference signal;
   obtaining a third averaged signal from four signals of peripheral pixels close to the first adjacent pixel neighboring to the judgment target pixel in an X-shaped direction and having the same color as the first adjacent pixel, and calculating a fourth difference signal from the third averaged signal and the one signal of the first adjacent pixel;
   obtaining a fourth averaged signal from four signals of peripheral pixels close to the second adjacent pixel neighboring to the judgment target pixel in the X-shaped direction and having the same color as the second adjacent pixel, and calculating a fifth difference signal from the fourth averaged signal and the one signal of the second adjacent pixel;

selecting a smaller one of the fourth difference signal and the fifth difference signal as a sixth difference signal; and selecting a smaller one or a larger one of the third difference signal and the sixth difference signal to judge presence/absence of correlations in the two directions of the plus-sign-like direction and the X-shaped direction, and extracting the image pattern information in the two directions to control the substitution circuit.

20. The imaging apparatus according to claim 1, wherein the pattern extracting circuit includes:

difference signal calculation processing of determining the judgment target pixel as a defective pixel when a signal of the judgment target pixel is larger than a maximum value of respective signals of peripheral pixels thereof or smaller than a minimum value of the same, and calculating a difference signal between a signal of the adjacent pixel and each of signals of peripheral pixels neighboring to the adjacent pixel in a plus-sign-like direction and a difference signal between the signal of the adjacent pixel and each of signals of peripheral pixels neighboring to the adjacent pixel in an X-shaped direction;

correlation judgment processing of judging correlations with respect to the peripheral pixels in the plus-sign-like direction of the adjacent pixel and the peripheral pixels in the X-shaped direction of the same based on a result of the difference signal calculation; and generation processing of generating a control signal that is used to control the substitution circuit in accordance with a result of the correlation judgment processing.

21. The imaging apparatus according to claim 1, wherein the pattern extracting circuit further performs:

obtaining a first averaged signal from four signals of peripheral pixels close to the adjacent pixel in a plus-sign-like direction and having the same color as the adjacent pixel, and obtaining a first difference signal from the first averaged signal and one signal of the adjacent pixel;

obtaining a second averaged signal from four signals of peripheral pixels close to the adjacent pixel in an X-shaped direction and having the same color as the adjacent pixel, and obtaining a second difference signal from the second averaged signal and one signal of the adjacent pixel; and selecting a smaller one or a larger one of the first difference signal and the second difference signal to judge presence/absence of correlations in the two directions of the plus-sign-like direction and the X-shaped direction, and extracting the image pattern information in the two directions to control the substitution circuit.

22. An imaging apparatus which uses a defect correction circuit to perform predetermined signal processing with respect to image signals respectively output from an imaging section in which a plurality of pixels each formed of a photoelectric transducer are two-dimensionally arranged, wherein the defect correction circuit includes:

a pattern extraction circuit which extracts image pattern information based on a signal of an adjacent pixel that is adjacent to a judgment target pixel and signals of peripheral pixels that are placed around the adjacent pixel with the adjacent pixel as the center and have the same color as the adjacent pixel in the image signals, the peripheral pixels excluding the judgment target pixel;

a substitution circuit which substitutes a signal of the judgment target pixel by signals of peripheral pixels that are close to the judgment target pixel and have the same color as the judgment target pixel; and wherein the pattern extracting circuit performs:

sorting the signal of the judgment target pixel and signals of peripheral pixels having the same color as the judgment target pixel in order of level;

calculating a subtraction result by subtracting a signal at a predetermined rank excluding a smallest one in a smaller signal side from a signal at a predetermined rank excluding a largest one in a larger signal side and multiplying the subtraction result by a predetermined coefficient to obtain a first signal;

adding the first signal to the signal at a predetermined rank in a larger signal side to obtain a second signal;

subtracting the first signal from the signal at a predetermined rank in a smaller signal side to obtain a third signal;

determining whether the signal of the judgment target pixel is larger than the second signal;

determining whether the signal of the judgment target pixel is smaller than the third signal; and producing a control signal to control the substitution circuit in accordance with determination.

23. An imaging apparatus which uses a defect correction circuit to perform predetermined signal processing with respect to image signals respectively output from an imaging section in which a plurality of pixels each formed of a photoelectric transducer with a color filter provided thereon are two-dimensionally arranged, wherein the defect correction circuit performs:

sorting the signal of a judgment target pixel and signals of peripheral pixels having the same color as the judgment target pixel in order of level in the image signals;

calculating a subtraction result by subtracting a signal at a predetermined rank excluding a smallest one in a smaller signal side from a signal at a predetermined rank excluding a largest one in a larger signal side and multiplying the subtraction result by a predetermined coefficient to obtain a first signal;

adding the first signal to the signal at a predetermined rank in a larger signal side to obtain a second signal;

subtracting the first signal from the signal at a predetermined rank in a smaller signal side to obtain a third signal;

determining whether the signal of the judgment target pixel is larger than the second signal;

determining whether the signal of the judgment target pixel is smaller than the third signal; and substituting the signal of the judgment target pixel in accordance with determination.

* * * * *